(12) United States Patent
Nomura et al.

(10) Patent No.: US 7,889,966 B2
(45) Date of Patent: Feb. 15, 2011

(54) INFORMATION PROCESSING APPARATUS AND METHOD AS WELL AS PROGRAM STORAGE MEDIUM

(75) Inventors: Yasuo Nomura, Kanagawa (JP); Tatsuo Eguchi, Kanagawa (JP); Yasuhiko Terashita, Kanagawa (JP); Yoshikazu Watanabe, Kanagawa (JP); Nobuaki Yamaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1616 days.

(21) Appl. No.: 09/771,557

(22) Filed: Jan. 30, 2001

(65) Prior Publication Data

US 2001/0024562 A1    Sep. 27, 2001

(30) Foreign Application Priority Data

Feb. 3, 2000    (JP) .............................. 2000-025914

(51) Int. Cl.
*H04N 5/91*    (2006.01)
*H04N 5/93*    (2006.01)

(52) U.S. Cl. .............................. 386/52; 386/45; 386/46; 386/51; 386/126

(58) Field of Classification Search .................... 386/52, 386/55, 4, 64, 68, 46, 96, 125, 95, 62, 113, 386/126; 360/13; 345/723–729, 537
See application file for complete search history.

(56) References Cited

U.S. PATENT DOCUMENTS

| | | | | |
|---|---|---|---|---|
| 5,884,298 | A * | 3/1999 | Smith et al. ...................... | 707/2 |
| 6,381,398 | B1 * | 4/2002 | Yamauchi et al. .............. | 386/52 |
| 6,411,771 | B1 * | 6/2002 | Aotake ......................... | 386/52 |
| 6,549,307 | B1 * | 4/2003 | Makishima et al. ..... | 348/333.11 |
| 6,590,585 | B1 * | 7/2003 | Suzuki et al. ............... | 715/719 |
| 6,674,995 | B1 * | 1/2004 | Meyers et al. .............. | 455/41.2 |
| 6,798,980 | B1 * | 9/2004 | Seo ............................. | 386/125 |
| 6,850,691 | B1 * | 2/2005 | Stam et al. .................... | 386/68 |
| 2003/0142955 | A1 * | 7/2003 | Hashizume et al. .......... | 386/52 |

FOREIGN PATENT DOCUMENTS

| | | |
|---|---|---|
| JP | 6-131145 | 5/1994 |
| JP | 8-153376 | 6/1996 |
| JP | 8-320767 | 12/1996 |
| JP | 10-228440 | 8/1998 |
| JP | 11-96194 | 4/1999 |

(Continued)

OTHER PUBLICATIONS

U.S. Appl. No. 09/773,911, filed Feb. 2, 2001, pending.

(Continued)

*Primary Examiner*—Jamie J Atala
(74) *Attorney, Agent, or Firm*—Oblon, Spivak, McClelland, Maier & Neustadt, L.L.P.

(57) ABSTRACT

An information processing apparatus is disclosed which allows image data to be used commonly by a plurality of personal computers. A check box of a copy option setting window is selected in order to delete AV contents of an original recorded on a HDD after the AV contents are copied from the HDD into an external recording medium. A check box is selected in order to set so that AV contents recorded as compression data of the MPEG 2 system on the HDD are copied onto the external recording medium after they are converted into compression data of the MPEG 1 system which has compatibility with a video CD.

16 Claims, 16 Drawing Sheets

FOREIGN PATENT DOCUMENTS

JP    11-144033    5/1999
JP    11-313287    11/1999

OTHER PUBLICATIONS

U.S. Appl. No. 09/773,918, filed Feb. 2, 2001, pending.
U.S. Appl. No. 09/556,949, filed Apr. 21, 2000, pending.
U.S. Appl. No. 09/556,750, filed Apr. 21, 2000, pending.
U.S. Appl. No. 09/557,172, filed Apr. 21, 2000, pending.
U.S. Appl. No. 09/720,129, filed May 18, 2001, pending.
U.S. Appl. No.09/720,537, filed Dec. 21, 2000, pending.

* cited by examiner

INFORMATION PROCESSING APPARATUS AND METHOD AS WELL AS PROGRAM STORAGE MEDIUM

BACKGROUND OF THE INVENTION

This invention relates to an information processing apparatus and method as well as a program storage medium, and more particularly to an information processing apparatus and method and a program storage medium suitable for use to copy an image recorded on a predetermined recording medium onto another recording medium.

A personal computer which includes a built-in tuner is available. The personal computer receives image and sound signals from a television broadcasting station, converts the received image and sound signals into predetermined digital data, records the digital data onto a built-in hard disk or some other recording medium and plays back the recorded digital data when necessary.

When it is intended to use such a personal computer as just described to store digital image and sound data, the digital image and sound data are compressed and coded in accordance with a predetermined method to decrease the information amount to be stored.

However, if it is intended to record digital data such as digital image data onto a recording medium which can be used with a plurality of personal computers such as a magneto-optical disk, the data format of the digital data such as digital image data preferably complies with a compression coding method supported by many personal computers.

Meanwhile, care must be taken of digital data such as image information which is protected by the copyright so that a duplicate of the same may not be produced readily.

SUMMARY OF THE INVENTION

It is an object of the present invention to provide an information processing apparatus and method and a program storage medium by which both of common use and protection by the copyright of data can be satisfied.

In order to attain the objects described above, according to the present invention, when it is intended to copy digital data such as digital image data between different recording media, it can be set whether or not the compression coding method should be changed and whether or not some of original data should be deleted.

In particular, according to an aspect of the present invention, there is provided an information processing apparatus capable of copying image information recorded on a first recording medium onto a second recording medium, comprising display control means for controlling displaying of a copying operation window which includes an icon corresponding to the first recording medium, an image information icon or icons corresponding to the image information recorded on the first recording medium and an icon corresponding to the second recording medium, moving means for selecting and moving one of the image information icons on the copying operation window, first setting means for setting whether or not a data format of the image information determined as an object of copying should be converted, readout means for reading out the image information corresponding to the image information icon selected by the moving means from the first recording medium, conversion means for converting the data format of the image information read out by the readout means in response to a result of the setting of the first setting means, and writing means for writing the image information read out by the readout means or the image information converted by the conversion means onto the second recording medium in response to the result of the setting of the first setting means.

According to another aspect of the present invention, there is provided an information processing method for an information processing apparatus which is capable of copying image information recorded on a first recording medium onto a second recording medium, comprising a display control step of controlling displaying of a copying operation window which includes an icon corresponding to the first recording medium, an image information icon or icons corresponding to the image information recorded on the first recording medium and an icon corresponding to the second recording medium, a moving step of selecting and moving one of the image information icons on the copying operation window, a setting step of setting whether or not a data format of the image information determined as an object of copying should be converted, a readout step of reading out the image information corresponding to the image information icon selected by the processing of the moving step from the first recording medium, a conversion step of converting the data format of the image information read out by the processing of the readout step in response to a result of the setting by the processing of the setting step, and a writing step of writing the image information read out by the processing of the readout step or the image information converted by the processing of the conversion step onto the second recording medium in response to the result of the setting by the processing of the setting step.

According to a further aspect of the present invention, there is provided a program storage medium on which a computer-readable program for controlling copying of image information recorded on a first recording medium onto a second recording medium is recorded, the program comprising a display control step of controlling displaying of a copying operation window which includes an icon corresponding to the first recording medium, an image information icon or icons corresponding to the image information recorded on the first recording medium and an icon corresponding to the second recording medium, a moving step of selecting and moving one of the image information icons on the copying operation window, a setting step of setting whether or not a data format of the image information determined as an object of copying should be converted, a readout step of reading out the image information corresponding to the image information icon selected by the processing of the moving step from the first recording medium, a conversion step of converting the data format of the image information read out by the processing of the readout step in response to a result of the setting by the processing of the setting step, and a writing step of writing the image information read out by the processing of the readout step or the image information converted by the processing of the conversion step onto the second recording medium in response to the result of the setting by the processing of the setting step.

With the information processing apparatus and method as well as the program of the program storage medium, it is set whether or not a data format of image information determined as an object of copying should be converted, and image information read out from a first recording medium or image information obtained by converting the format of the image information is written onto a second recording medium. Consequently, image data can be used commonly by a plurality of personal computers.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
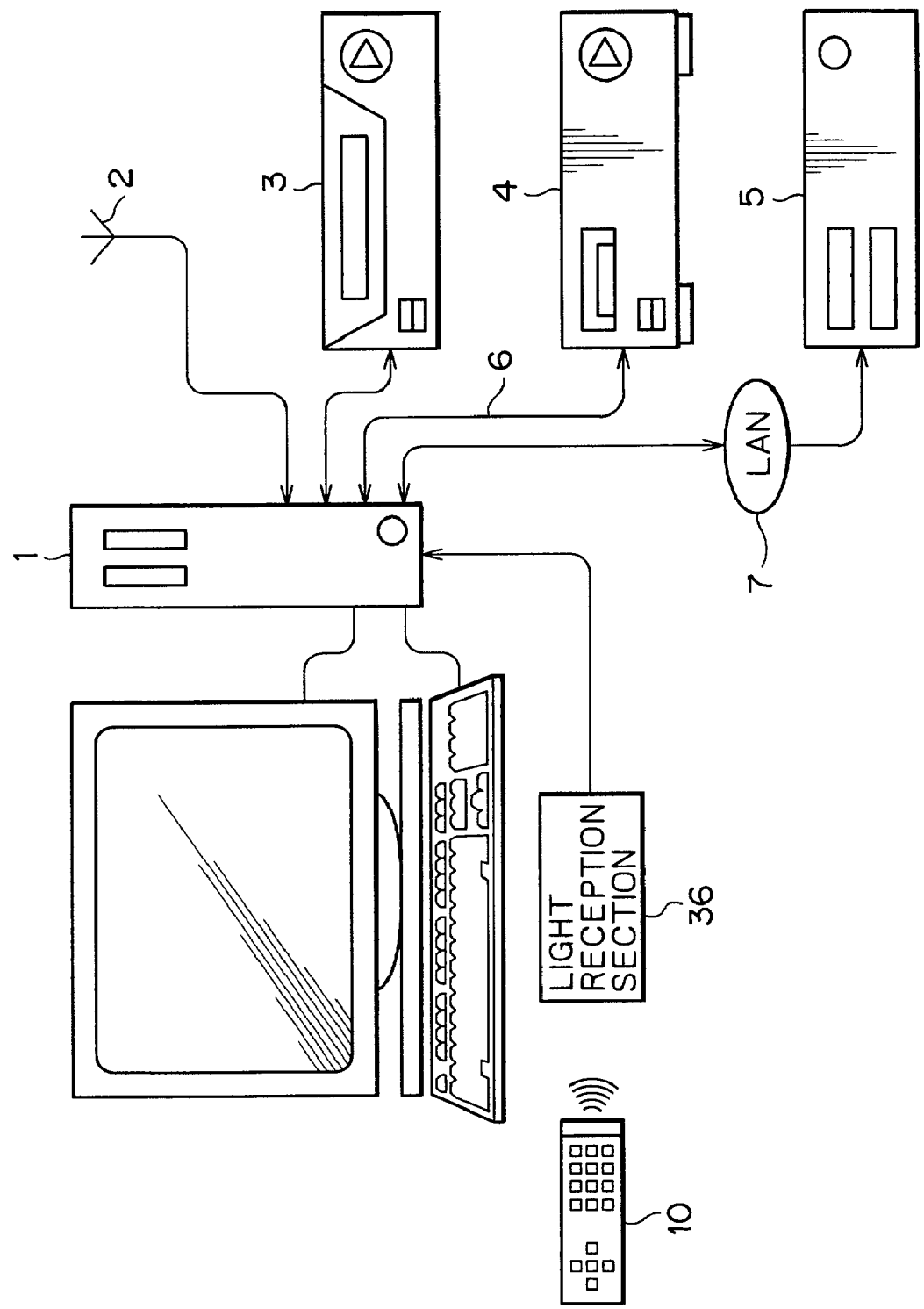
FIG. 1 is a schematic view showing an image recording and playback system to which the present invention is applied.

Referring first to FIG. 1, there is shown an image recording and playback system to which the present invention is applied. The image recording and playback system includes an antenna 2 for receiving a broadcasting signal transmitted from a predetermined television broadcasting station not shown, and a personal computer (PC) 1 which reproduces predetermined image and sound signals (that is, the image and sound of a television program) from the broadcasting signal received by the antenna 2 and records the image and sound signals. The personal computer 1 receives an analog signal supplied from a video cassette recorder (VCR) 3 or receives digital data supplied from a digital video cassette recorder (DVCR) 4 through a network 6, and reproduces image and sound signals from the received analog signal or the received digital data and records the image and sound signals. Typically, the network 6 may be formed from an IEEE (Institute of Electrical and Electronic Engineers) 1394 bus.

The personal computer 1 supplies an analog signal such as, for example, an analog signal of the NTSC (National Television System Committee) system corresponding to image and sound signals recorded therein to the VCR 3 or supplies digital data corresponding to image and sound signals recorded therein to the DVCR 4 or a personal computer 5 which is connected thereto through a local area network (LAN) 7.

Further, the personal computer 1 can edit the image and sound signals recorded therein.

Furthermore, the personal computer 1 can execute various processes in response to an operation signal transmitted thereto from a remote controller 10. The remote controller 10 is operated by a user in order to input various instructions to a CPU 21 or indicate or select a point on a screen of a display unit 30, and transmits an infrared signal as an operation signal corresponding to the operation.

Figure 2:
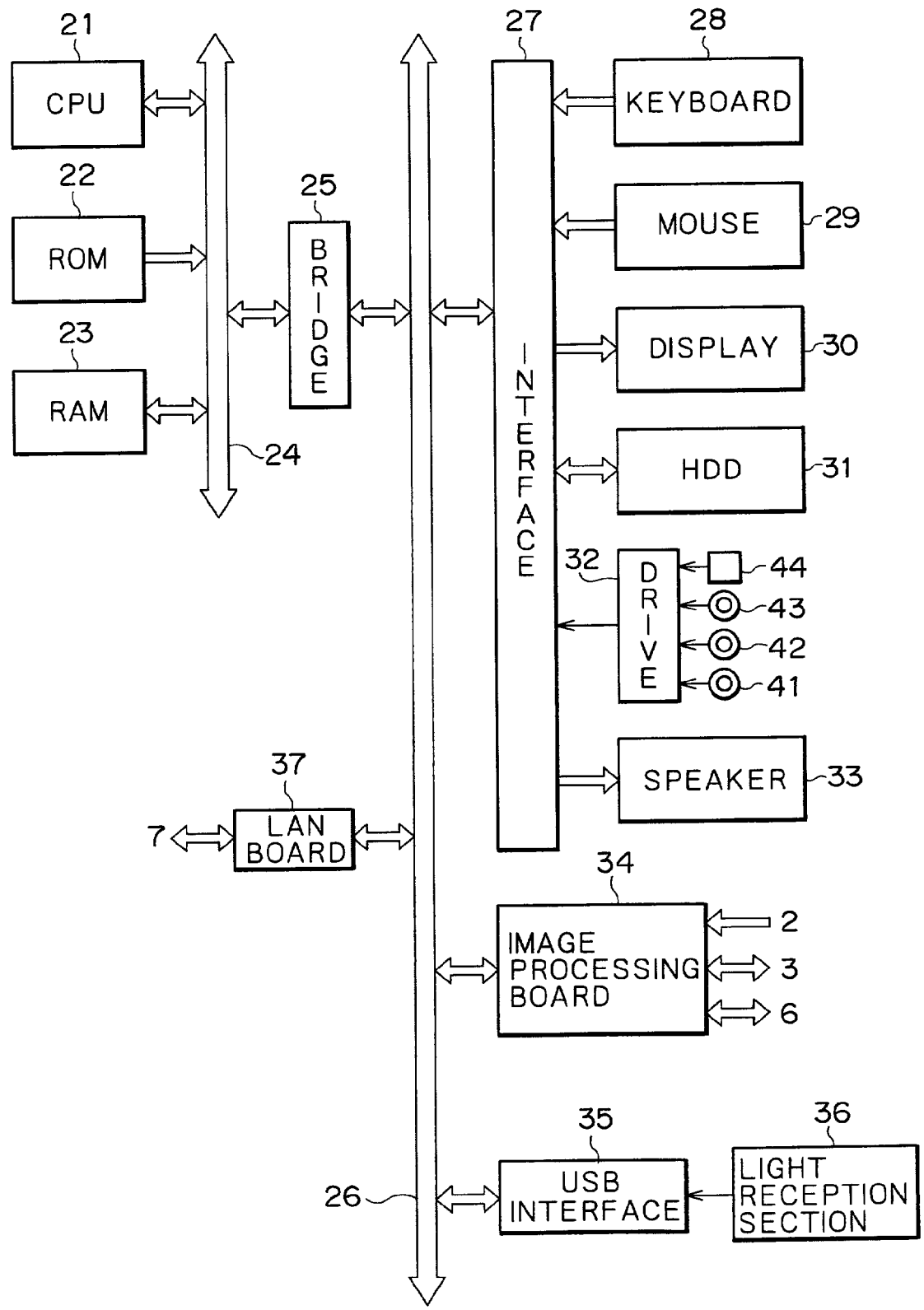
FIG. 2 is a block diagram showing an example of a construction of a personal computer shown in FIG. 1.

FIG. 2 is a block diagram showing a construction of the personal computer 1. Referring to FIG. 2, a CPU (central processing unit) 21 actually executes various application programs and a basic OS (operating system). A ROM (read-only memory) 22 commonly stores a program to be used by the CPU 21 and basically fixed data of parameters for arithmetic operation. A RAM (random-access memory) 23 stores a program used for execution of the CPU 21 and parameters which vary suitably in such execution. The CPU 21, ROM 22, and RAM 23 are connected to each other suitably by a host bus 24 which may be formed from a CPU bus or a memory bus.

The host bus 24 is connected to an external bus (which may be hereinafter also referred to as PCI bus) 26 such as a PCI (Peripheral Component Interconnect/Interface) bus by a bridge 25.

An interface 27, an image processing board 34, a USB (universal serial bus) interface 35 and a LAN board 37 are connected to the external bus 26.

A keyboard 28 is connected to the interface 27 and operated by a user in order to input various instructions to the CPU 21. A mouse 29 is operated by the user in order to indicate or select a point on the screen of the display unit 30. The display unit 30 displays various information in the form of a text or an image. A HDD (hard disk drive) 31 drives hard disks to record or play back a program to be executed by the CPU 21 or various data onto or from the hard disks. A drive 32 records or plays back a program to be executed by the CPU 21 or various data onto or from a magnetic disk 41 (including a floppy disk), an optical disk 42 (including a CD (Compact Disk) and a DVD (Digital Versatile Disk)), a magneto-optical disk 43 (including an MD (Mini Disc)), or a semiconductor memory 44. A speaker 33 plays back sound signals.

The components 28 to 33 mentioned above are connected to the interface 27. The interface 27 is connected to the CPU 21 through the external bus 26, bridge 25 and host bus 24.

The image processing board 34 is controlled by the CPU 21 and compresses and codes image or sound data based on a broadcasting signal supplied from the antenna 2, an analog image or sound signal supplied from the VCR 3 or digital image or sound data supplied from the DVCR 4 through the network 6 in accordance with a predetermined form (which is hereinafter described) and outputs the compression coded image or sound data to the HDD 31 or the drive 32 through the external bus 26 and the interface 27.

The image processing board 34 receives digital image or sound data (digital data compressed and coded in accordance with a predetermined form) read out by the HDD 31 or the drive 32 and supplied thereto through the external bus 26 and the interface 27. The image processing board 34 decompresses the digital image or sound data to obtain an analog image or sound signal and supplies the signal to the VCR 3 or to the display unit 30 through the external bus 26 and the interface 27. Further, the image processing board 34 converts the analog image or sound signal into a digital signal of the DVCR format and supplies the digital signal to the DVCR 4 through the network 6 or to the personal computer 5 through the external bus 26 and the LAN card 37.

The USB interface 35 includes a USB connector having a hot plug function which allows a light reception element 36 or a like element to be mounted onto or removed from the USB connector at any timing. The light reception element 36 connected to the USB connector receives and converts an infrared signal as an operation signal transmitted thereto from the remote controller 10 into an electric signal and supplies the electric signal to the CPU 21 through the USB interface 35, external bus 26, bridge 25 and host bus 24.

The LAN board 37 includes an interface for data communication such as a 10BASE-T port and communicates data with the personal computer 5 connected thereto through the LAN 7.

The image processing board 34, USB interface 35 and LAN board 37 are connected to the CPU 21 through the external bus 26, bridge 25 and host bus 24.

Figure 3:
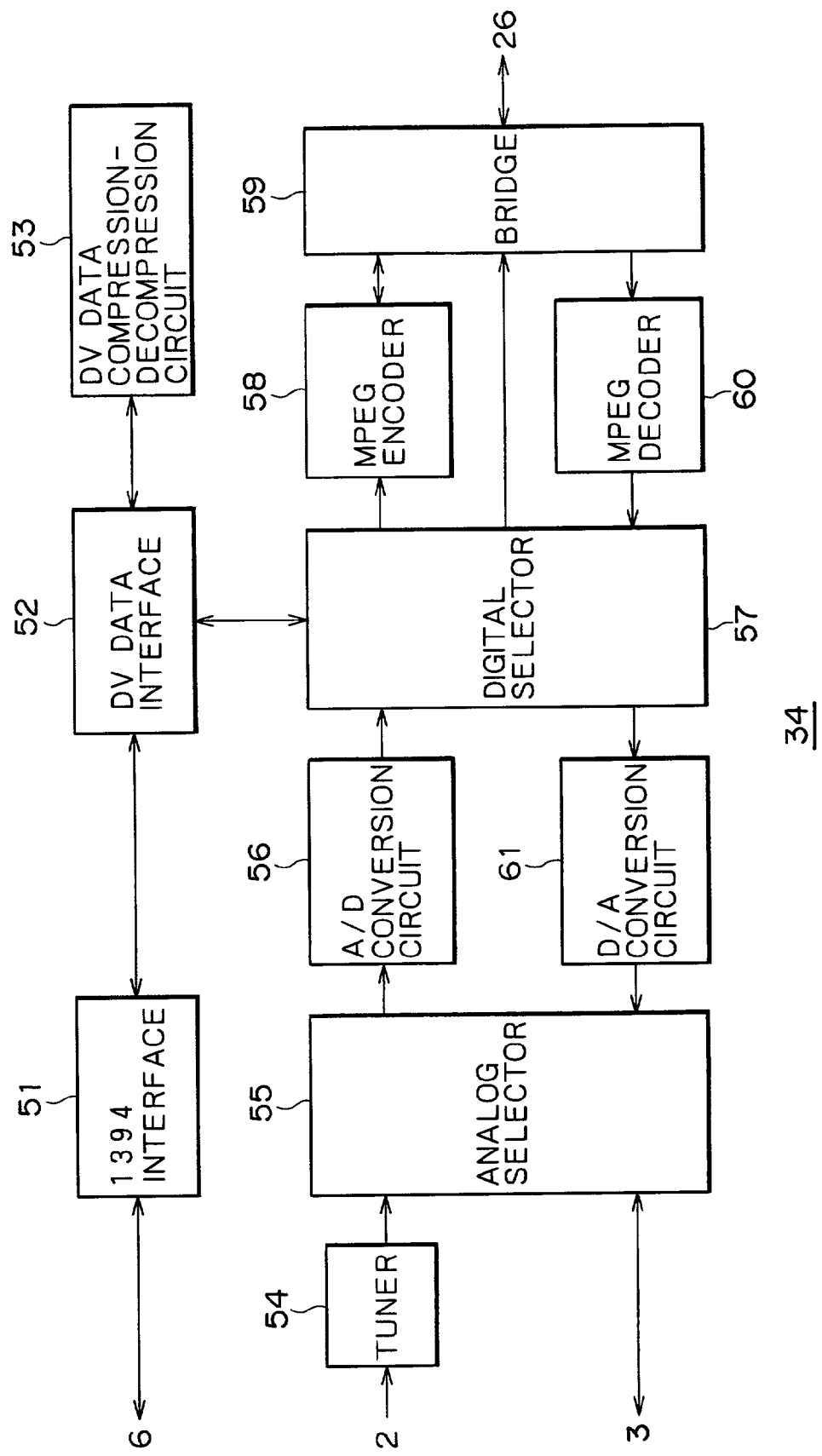
FIG. 3 is a block diagram showing an example of a construction of an image processing board shown in FIG. 2.

Now, a construction of the image processing board 34 is described with reference to FIG. 3. A 1394 interface 51 is configured in conformity with the prescription of the IEEE 1394 and connected to the network 6. The 1394 interface 51 thus receives digital image or sound data of the DVCR format supplied thereto from the DVCR 4 in accordance with a protocol which complies with the prescription of the IEEE 1394 and supplies the digital image or sound data to a DV (digital video) data interface 52.

Further, the 1394 interface 51 supplies digital image or sound data of the DVCR format supplied thereto from the DV data interface 52 to the DVCR 4 in accordance with a protocol which complies with the prescription of the IEEE 1394.

The DV data interface 52 outputs digital image or sound data of the DVCR format supplied thereto from the 1394 interface 51 or digital image or sound data supplied thereto from a digital selector 57 such as, for example, digital data which are not in a compressed form of 4:1:1 or the like. Further, the DV data interface 52 outputs digital image or sound data of the DVCR format supplied thereto from a DV data compression-decompression circuit 53 and outputs digital image or sound data not in a compressed form supplied thereto from the DV data compression-decompression circuit 53 to the digital selector 57.

The DV data compression-decompression circuit 53 decompresses digital image or sound data of the DVCR format, that is, digital data in a compressed form, supplied thereto from the DV data interface 52 into non-compressed digital image or sound data and outputs the decompressed data to the DV data interface 52. Further, the DV data compression-decompression circuit 53 compresses non-compressed digital image or sound data supplied thereto from the DV data interface 52 into digital image or sound data of the DVCR format and outputs the compressed data to the DV data interface 52.

A tuner 54 receives a RF (radio frequency) signal supplied thereto from the antenna 2, extracts an analog image and sound signal of a predetermined channel from the RF signal and outputs the analog image and sound signal to an analog selector 55. The analog selector 55 selects one of analog image or sound signals supplied thereto from the tuner 54, the VCR 3 and a D/A (digital/analog) conversion circuit 61 and outputs the selected signal to an A/D (analog/digital) conversion circuit 56 or the VCR 3.

The A/D conversion circuit 56 converts an analog image and sound signal supplied thereto from the analog selector 55 into digital data such as, for example, digital image data of 4:1:1 and outputs the digital data to the digital selector 57. The digital selector 57 receives digital image and sound data outputted from the DV data interface 52, the A/D conversion circuit 56 and an MPEG (Moving Picture Experts Group) decoder 60, selects one of the received digital image and sound data and outputs selected data to the DV data interface 52, an MPEG encoder 58 or the D/A conversion circuit 61 and also to a bridge 59. The digital selector 57 further outputs information of a scene changing position to the bridge 59.

The MPEG encoder 58 compresses and codes digital image and sound data supplied thereto from the digital selector 57 into digital data of the MPEG system (the MPEG 2 system according to the initial setting, but this can be changed suitably to the MPEG 1 system) and outputs the compressed digital data to the bridge 59. The MPEG encoder 58 further converts an image signal at a scene change into a reduced still picture called thumbnail picture and outputs the still picture to the bridge 59. Furthermore, the MPEG encoder 58 converts compressed digital data of the MPEG 2 system inputted thereto from the bridge 59 into compressed digital data of the MPEG 1 system and outputs the compressed digital data to the bridge 59.

It is to be noted that, in the following description, digital image and sound data obtained by compression and coding in accordance with the MPEG 1 system are referred to as MPEG 1 data whereas digital image and sound data obtained by compression and coding in accordance with the MPEG 2 system are referred to as MPEG 2 data, and the term MPEG data is used to signify both of MPEG 1 data and MPEG 2 data.

The bridge 59 outputs non-compressed digital image and sound data supplied from the digital selector 57 to the display unit 30 through the PCI bus 26 and the interface 27. The bridge 59 further outputs MPEG data supplied thereto from the MPEG encoder 58 to the HDD 31, the drive 32 or the CPU 21 through the PCI bus 26. Furthermore, the bridge 59 receives MPEG data supplied thereto from the HDD 31 or the drive 32 through the PCI bus 26 and outputs the received MPEG data to the MPEG decoder 60. Besides, the bridge 59 outputs MPEG 2 data supplied thereto from the HDD 31 or the drive 32 through the PCI bus 26 to the MPEG encoder 58.

The MPEG decoder 60 decompresses the MPEG data supplied thereto from the bridge 59 to produce non-compressed digital image and sound data and outputs the produced data to the digital selector 57.

The D/A conversion circuit 61 converts the digital image and sound data supplied thereto from the digital selector 57 into an analog signal and outputs the analog signal to the analog selector 55.

It is to be noted that processing performed by the MPEG encoder 58 and/or the MPEG decoder 60 in the form of hardware may be performed alternatively by the CPU 21 which executes a predetermined software (program).

Figure 4:
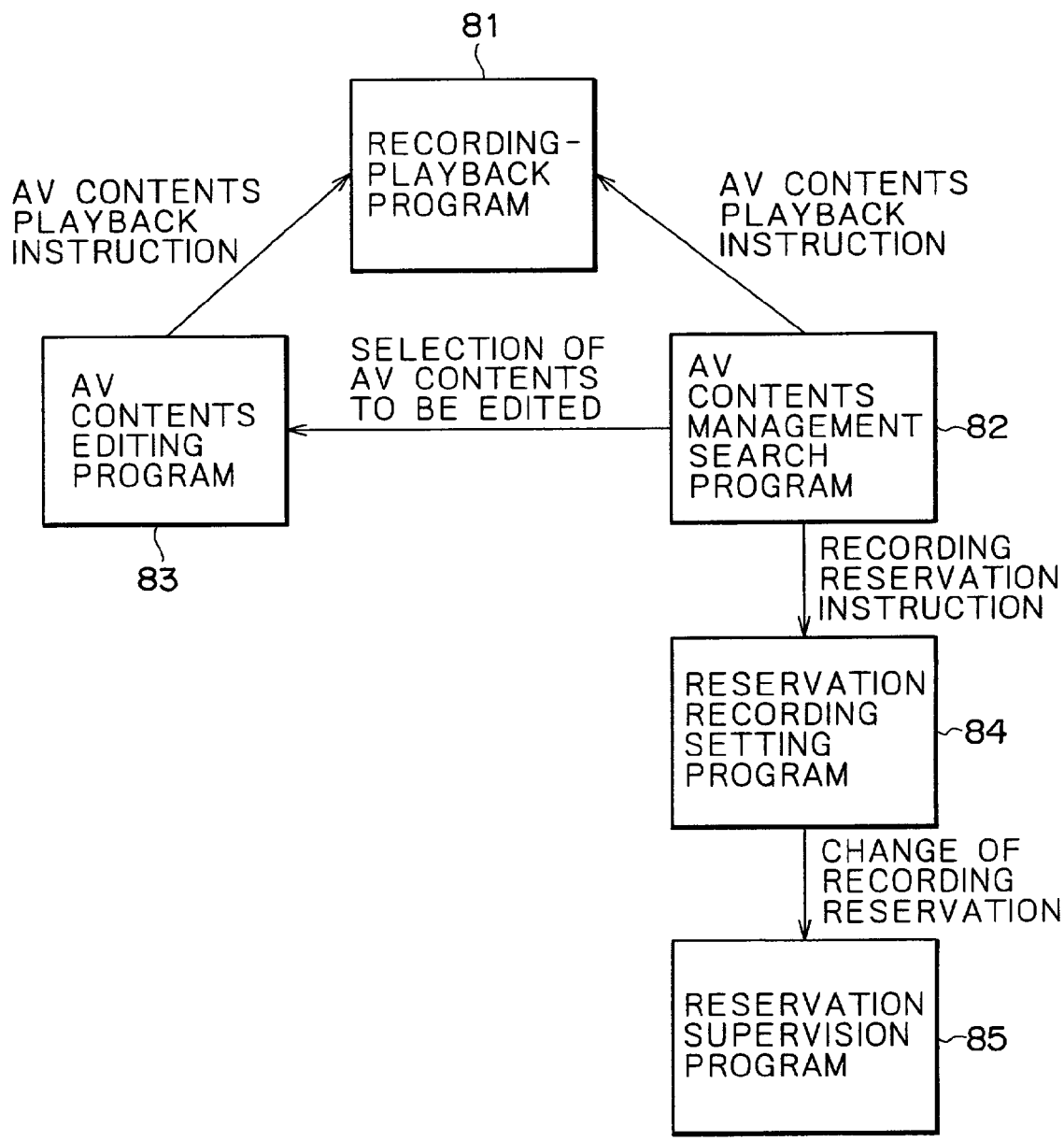
FIG. 4 is a block diagram illustrating an application program executed by the personal computer.

FIG. 4 illustrates a configuration of application programs executed by the personal computer 1. A recording-playback program 81 causes the image processing board 34 to select one of an analog image and sound signal of a predetermined channel received by the tuner 54, an analog image and sound signal supplied from the VCR 3 or digital image and sound data supplied from the DVCR 4 through the network 6, compress and code the selected analog signal or digital data into MPEG data and record the MPEG data as AV (Audio Visual) contents formed from one or more files of a predetermined format onto the HDD 31 or the drive 32.

Further, the recording-playback program 81 causes the image processing board 34 to decompress MPEG data included in AV contents recorded as one or more files of a predetermined format on the HDD 31 or in one of the storage media 41 to 44 to produce non-compressed digital image or sound data, supplies the digital image data to the display unit 30 so as to be displayed on the display unit 30 and supplies the digital sound data to the speaker 33 so as to be played back.

Figure 6:
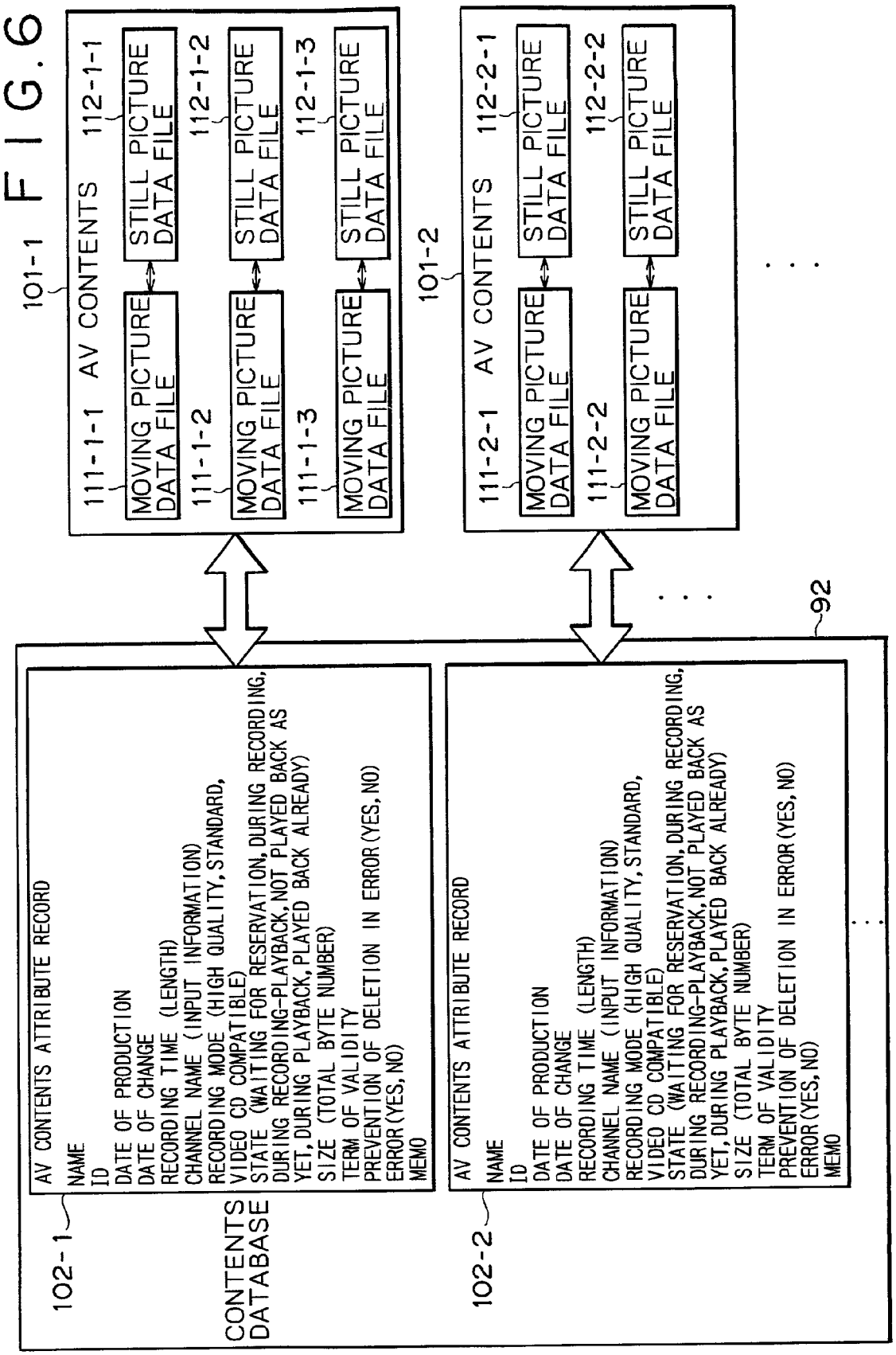
FIG. 6 is a diagrammatic view showing a construction of AV contents.

An AV contents management search program 82 is used to display predetermined information corresponding to an AV contents attribute record 102 of FIG. 6 such as AV contents recorded on the HDD 31 or in any of the storage media 41 to 44 or dates on which the AV contents were recorded. Further, the AV contents management search program 82 instructs the recording-playback program 81 to play back predetermined AV contents, selects AV contents of an object of editing, supply information of the selected AV contents to an AV contents editing program 83 and instructs a reservation recording setting program 84 to perform reservation recording. Furthermore, the AV contents management search program 82 moves or copies AV contents recorded in the HDD 31 to any of the storage media 41 to 44.

The AV contents editing program 83 edits predetermined images and sound of selected AV contents, that is, links images and sound included in the selected AV contents, based on AV contents recorded on the HDD 31 or any of the storage media 41 to 44, and produces AV contents of a predetermined format for playing back the edited images or sound. The AV contents of the predetermined format produced by the AV contents editing program 83 do not include digital image or sound data but are formed from information which specifies the selected AV contents and information which specifies images and sound to be utilized, and can be played back using the recording-playback program 81.

The recording reservation setting program 84 produces AV contents for execution of reservation recording based on setting. The AV contents correspond to the setting (the recording time and the recording mode upon which the picture quality depends), and a storage area for the AV contents is secured in advance on the HDD 31 or on or in any of the storage media 41 to 44.

The reservation supervision program 85 normally operates or is resident when the personal computer 1 is operating (when the OS is operating) to execute reservation recording based on AV contents for execution of reservation recording produced by the reservation recording setting program 84 and time information supplied thereto from a real time clock (RTC) not shown. Further, the reservation supervision program 85 changes the setting of AV contents for execution of reservation recording.

Figure 5:
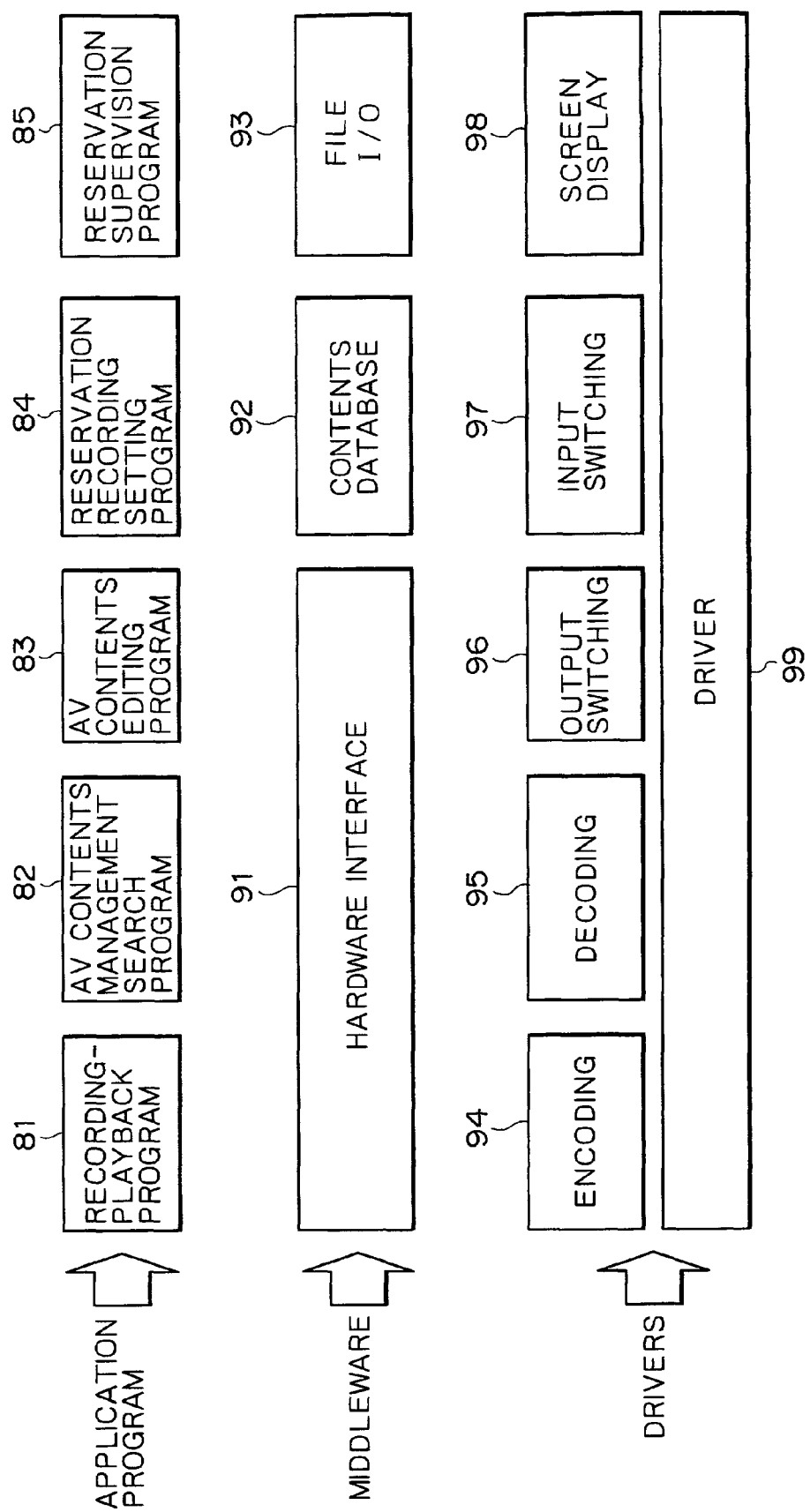
FIG. 5 is a block diagram illustrating an application program executed by the personal computer, middleware, and drivers.

FIG. 5 illustrates a configuration of application programs executed by the personal computer 1, middleware and drivers. The middleware controls any of the drivers to operate in accordance with a request from an application program. The drivers cause resources of predetermined hardware such as the MPEG encoder 58 of the image processing board 34 to operate actually.

A hardware interface 91 arbitrates use of a hardware resource requested by the recording-playback program 81, AV contents management search program 82, AV contents editing program 83, reservation recording setting program 84 or reservation supervision program 85 so that an application program may appropriately utilize a predetermined hardware resource based on setting such as various priorities.

A contents database 92 manages data of attributes of AV contents (which are hereinafter described) and provides data for specifying a file in which attribute data of AV contents or digital image or sound data corresponding to AV contents is stored to the recording-playback program 81, AV contents management search program 82, AV contents editing program 83, reservation recording setting program 84 or reservation supervision program 85.

A file I/O (Input/Output) 93 actually executes reading out or writing of data into or from a predetermined file of the contents database 92 in response to a reading or writing request for predetermined AV contents (formed from one or more files) of the recording-playback program 81, AV contents management search program 82, AV contents editing program 83, reservation recording setting program 84 or reservation supervision program 85.

An encode 94 executes control to cause the MPEG encoder 58 of the image processing board 34 to compress and code image or sound data inputted thereto from the digital selector 57 into digital data of the MPEG system.

A decode 95 executes control to cause the MPEG decoder 60 of the image processing board 34 to decompress image or sound data of the MPEG system inputted from the bridge 59.

An output switching 96 controls the analog selector 55 and the 1394 interface 51 of the image processing board 34 to operate to control outputting of an analog signal from the image processing board 34 or of digital data through the network 6.

An input switching 97 controls the analog selector 55, 1394 interface 51, DV data interface 52 and digital selector 57 of the image processing board 34 to operate to select an analog signal or digital data to be inputted to the image processing board 34.

A screen display 98 controls the digital selector 57 and the bridge 59 to control displaying of an image on the display unit 30.

A driver 99 is a program for causing the image processing board 34 to actually operate in response to a request from the encode 94, decode 95, output switching 96, input switching 97 or screen display 98.

In the following description, description of processing regarding sound is omitted.

FIG. 6 illustrates an example of a construction of AV contents. Referring to FIG. 6, the contents database 92 recorded on the HDD 31 or on any of the storage media 41 to 44 has attributes of individual AV contents recorded therein. An AV contents attribute record 102-1 recorded in the contents database 92 has stored therein data of attributes of AV contents 101-1 including a name, ID (identification data), a date of production, a date of change, a recording time, a channel name, a recording mode, a state, a size, a term of validity (indicated by a date and hour), setting of prevention of deletion in error, presence or absence of an error, and a memorandum. AV contents attribute record 102-2 recorded in the contents database 92 correspond to the AV contents 101-2 and has stored therein information similar to that of the AV contents attribute record 102-1.

Data of the recording mode stored in the AV contents attribute record 102-1 indicates that moving picture data files 111-1-1 to 111-1-3 have one of high quality, standard and video CD compatible (representing that data of an image are of the MPEG 1 system) modes. Similarly, data of the state stored in the AV contents attribute record 102-1 indicates that the AV contents 101-1 are in one of a waiting-for-reservation state, a during-recording state, a during-recording-playback (recording of image data and playback of the image data recorded are being performed) state, a not-played-back-as-yet state, a during-playback state, and a played-back-already state.

The information of presence or absence of an error represents such a state of the AV contents 101-1 as, for example, that the personal computer 1 fails during recording and complete data is not recorded, that the reception condition during recording becomes so unfavorable that an image cannot be reproduced from a signal inputted from the antenna 2 or that part of the moving picture data file 111-1-1 misses.

The term of validity and the prevention of deletion in error are set such that neither one of them is set or either one of them is set, but they are not set simultaneously at all.

The AV contents 101-1 are composed of the moving picture data files 111-1-1 to 111-1-3 and still picture data files 112-1-1 to 112-1-3 recorded on the HDD 31 or on any of the storage media 41 to 44. The moving picture data files 111-1-1 to 111-1-3 have stored therein image data which are compressed in accordance with the MPEG system. An image corresponding image data stored at the top of the moving picture data file 111-1-2 follows another image corresponding to image data stored at the last end of the moving picture data file 111-1-1. Similarly, an image corresponding to image data stored at the top of the moving picture data file 111-1-3 follows another image corresponding to image data stored at the last end of the moving picture data file 111-1-2.

The still picture data file 112-1-1 has stored therein image data of a reduced still picture produced from an image at a scene change of image data stored in the moving picture data file 111-1-1 and data of a point of time at the scene change (or an offset position on the moving picture data file 111-1-1). The still picture data file 112-1-2 has stored therein image data of a reduced still picture produced from an image at a scene change of image data stored in the moving picture data file 111-1-2 and data of a point of time at the scene change (or an offset position on the moving picture data file 111-1-2). The still picture data file 112-1-3 has stored therein image data of a reduced still picture produced from an image at a scene change of image data stored in the moving picture data file 111-1-3 and data of a point of time at the scene change (or an offset position on the moving picture data file 111-1-3).

The AV contents 101-2 are composed of moving picture data files 111-2-1 and 111-2-2 and still picture data files 112-2-1 and 112-2-2 and is formed in a similar manner as that of the AV contents 101-1. Therefore, detailed description of the AV contents 101-2 is omitted herein.

In the following description, where the AV contents 101-1 and the AV contents 101-2 need not be distinguished from each other, each of them is referred to merely as AV contents 101. Where the AV contents attribute record 102-1 and the AV contents attribute record 102-2 need not be distinguished from each other, each of them is referred to merely as AV contents 102. Where the moving picture data files 111-1-1 to 111-1-3 and the moving picture data files 111-2-1 to 111-2-2 need not be distinguished from each other, each of them is referred to merely as moving picture data file 111. Where the still picture data files 112-1-1 to 112-1-3 and the still picture data files 1122-1 to 112-2-2 need not be distinguished from each other, each of them is referred to merely as still picture data file 112.

By the way, the time required to read out the contents database 92 or AV contents 101 recorded in any of the storage media 41 to 44 which are external recording media is longer than the time required to read out the contents database 92 or AV contents 101 recorded on the HDD 31. Therefore, in order that data recorded on the storage media 41 to 44 may be processed equally in time to data recorded on the HDD 31, the AV contents attribute records 102 recorded on the storage media 41 to 44 and the still picture data files 112 of the AV contents 101 are read out and cached in advance.

Figure 7:
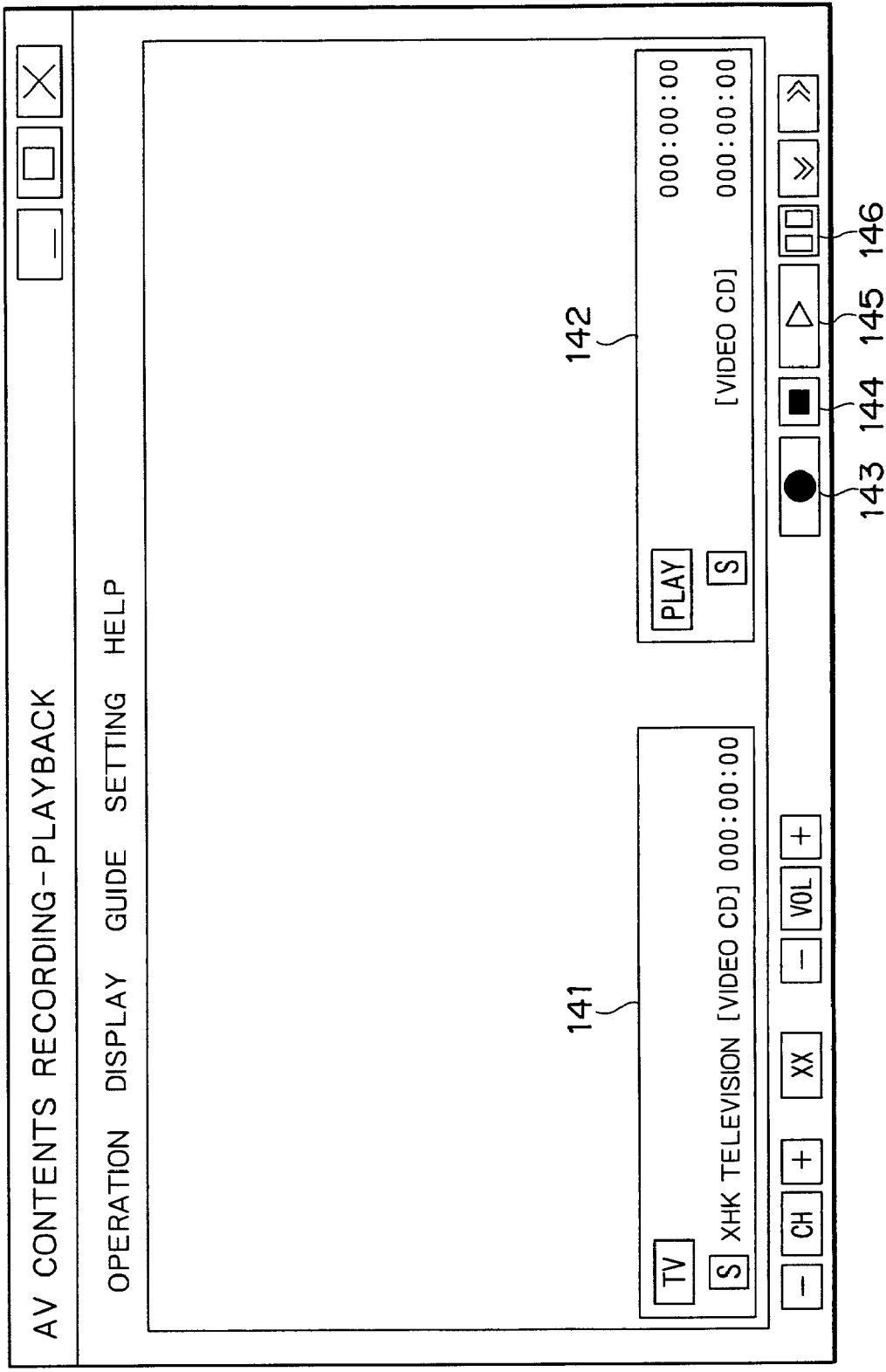
FIG. 7 is a schematic view illustrating an AV contents recording and playback window displayed by a recording and playback program shown in FIG. 4.

Subsequently, an AV contents recording-playback window displayed on the display unit 30 of the personal computer 1 by the recording-playback program 81 is described with reference to FIG. 7.

An image being recorded or being played back is displayed in the AV contents recording-playback window. In a recording window 141 at a lower portion of the AV contents recording-playback window, a channel to be recorded, a recording mode and so forth are set. In a playback window 142, a recording mode and so forth of AV contents to be played back are set. If the user inputs a recording instruction, then the recording window 141 is selected and rendered active. At this time, the playback window 142 is inactive. On the contrary, if the user inputs a playback instruction, then the playback window 142 is selected and rendered active. At this time, the recording window 141 is inactive.

When the recording window 141 is selected and rendered active, a recording button 143 and a stop button 144 are rendered active so that operation thereof is enabled. In particular, when the recording window 141 is selected and active, if the recording button 143 is clicked, then the recording-playback program 81 starts recording, but if the stop button 144 is clicked, then the recording-playback program 81 stops recording.

At this time, a playback button 145 and a pause button 146 are rendered inactive. Consequently, even if the playback button 145 or the pause button 146 is clicked, the recording-playback program 81 does not operate.

On the contrary when the playback window 142 is selected and active, the stop button 144, playback button 145 and pause button 146 are active and enable operation thereof. In particular, when the playback window 142 is selected and active, if the playback button 145 is clicked, then the recording-playback program 81 starts playback, but if the pause button 146 is clicked, then the recording-playback program 81 temporarily stops the playback. Further, if the stop button 144 is clicked, then the recording-playback program 81 stops the playback.

At this time, the recording button 143 is rendered inactive, and even if the recording button 143 is clicked, the recording button 143 does not operate.

Since the recording-playback program 81 controls each of the recording button 143, stop button 144, playback button 145 and pause button 146 to an active state or an inactive state in response to selection of the recording window 141 or the playback window 142 in this manner, the user can recognize contents which can be operated with certainty and therefore can operate rapidly. Further, erroneous operation can be suppressed.

Figure 8:
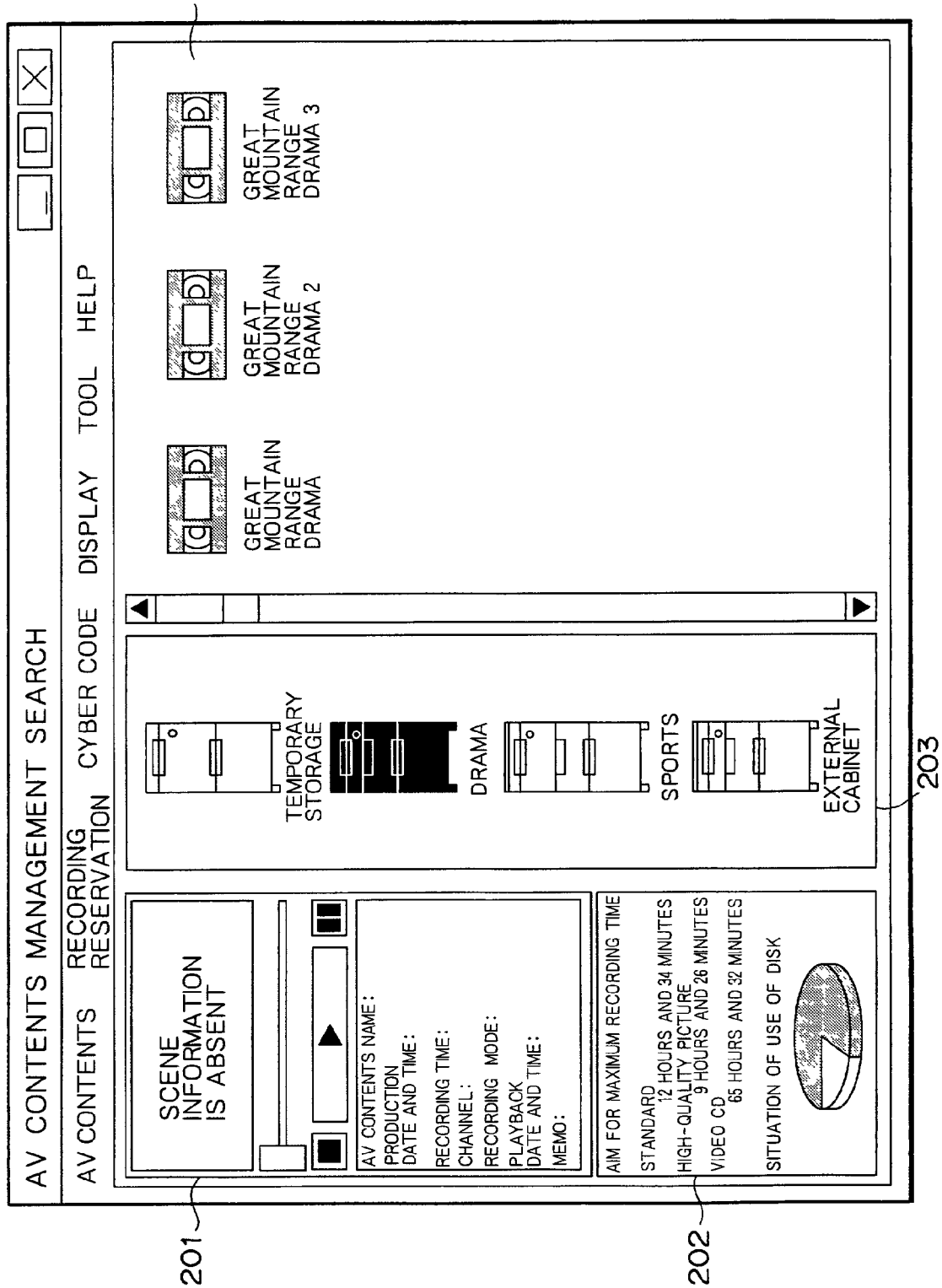
FIGS. 8 and 9 are schematic views illustrating AV contents management search windows displayed by an AV contents management search program shown in FIG. 4.

Subsequently, the AV contents management search program 82 is described with reference to FIGS. 8 and 9. FIG. 8 shows the AV management search window displayed on the display unit 30 of the personal computer 1 by the AV contents management search program 82 when an icon corresponding to AV contents 101 and displayed in an AV contents icon display window 204, which is hereinafter described, is not selected and hence is inactive.

In an AV contents information display window 201 of the AV contents management search window, data of attributes such as a name and a production date recorded in an AV contents attribute record 102 corresponding to one of the AV contents 101 which is active and a predetermined reduced still picture recorded in the still picture data file 112 corresponding to the AV contents 101 which are active are displayed. However, in the example of FIG. 8, since none of the AV contents 101 is active, attribute data or a reduced still picture is not displayed in the AV contents information display window 201.

In a recording time display window 202, a situation of use of data on the HDD 31, that is, an amount of data stored already on the HDD 31 and an amount of data which can be further recorded on the HDD 31, is displayed as a circular graph. Further, a criterion for time in which data can be recorded onto the HDD 31 in each recording mode, that is, a period of time calculated from a recordable data area of the HDD 31 and a data amount of images per unit time in each recording mode, is displayed.

In an AV contents classification display window 203, icons of virtual cabinets in which the AV contents 101 are stored in a classified state. Any of the AV contents 101 is set so that it is stored in one of the cabinets. In the example of FIG. 8, icons are displayed which individually correspond to a cabinet (temporary storage cabinet) in which those AV contents 101 classified for temporary storage are stored, another cabinet (drama cabinet) in which those AV contents 101 classified for a drama are stored, a further cabinet (sports cabinet) in which those AV contents 101 classified for sports are stored, and a still further cabinet (external cabinet) in which those AV contents 101 which are recorded on an external recording medium other than the HDD 31 such as, for example, the optical disk 42 are stored. It is to be noted that it is otherwise possible to set the personal computer 5 connected through the LAN 7 as an external cabinet and display an icon corresponding to the personal computer 5 in the AV contents classification display window 203.

Any of the icons corresponding to the individual cabinets can be rendered active by an operation of the mouse 29. In the example shown in FIG. 8, the icon for the drama cabinet is active.

In an AV contents icon display window 204, icons of those of the AV contents 101 which are stored in that one of the cabinets displayed in the AV contents classification display window 203 whose icon is active are displayed. In the example shown in FIG. 8, since the icon for the drama cabinet of the AV contents classification display window 203 is active, icons corresponding to the AV contents 101 of a "Great mountain range drama", a "Great mountain range drama 2" and a "Great mountain range drama 3" which are classified to the dram are displayed.

Figure 9:
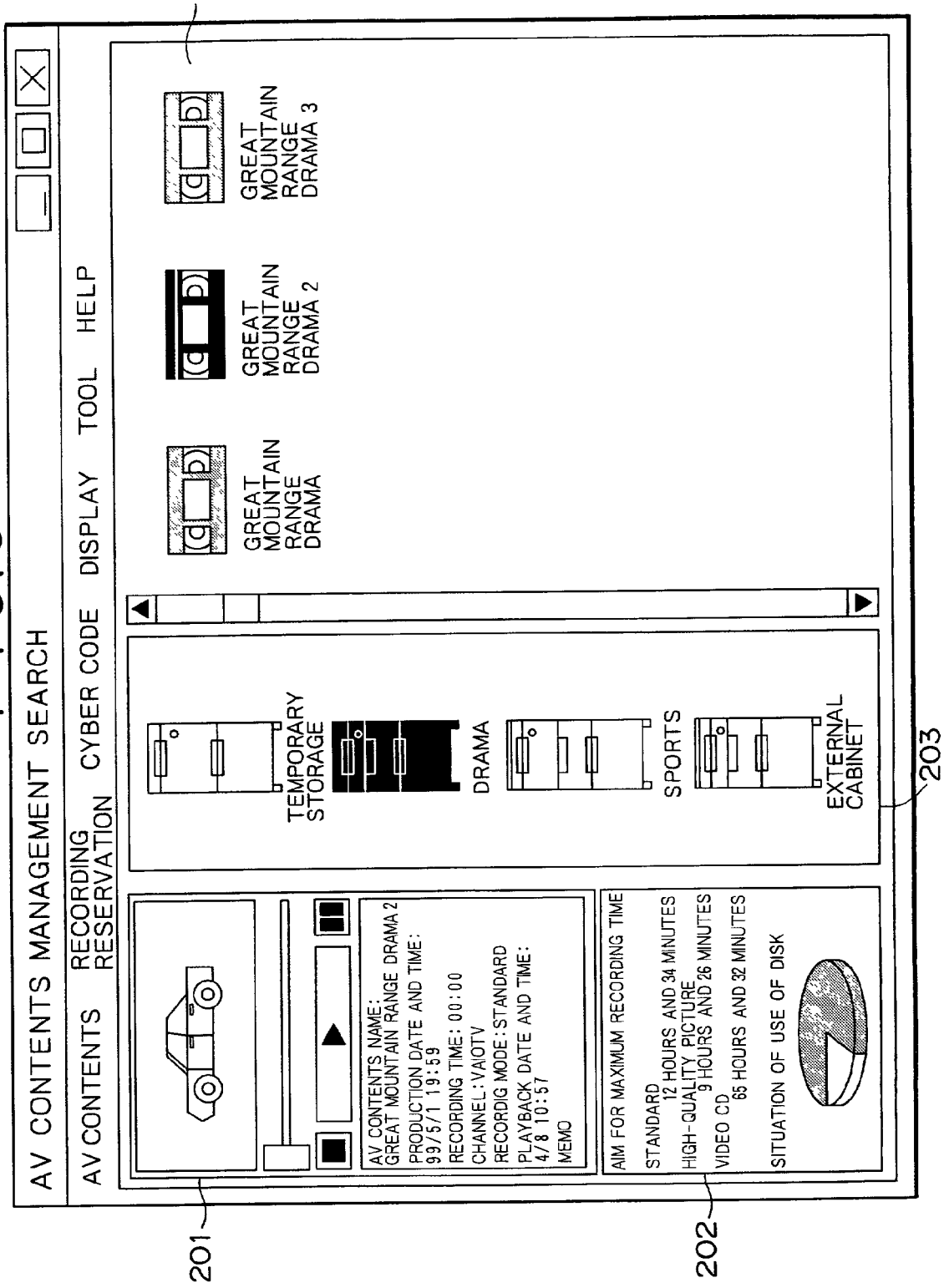

FIG. 9 shows a display example when an icon for predetermined AV contents 101 displayed in the AV contents icon display window 204 is active. In FIG. 9, the icon for the AV contents 101 of the "Great mountain range drama 2" displayed in the AV contents icon display window 204 is active. In this instance, in the AV contents information display window 201, attribute data such as a name and a production date recorded in the AV contents attribute record 102 corresponding to the AV contents 101 of the "Great mountain range drama 2" whose icon is active and a predetermined reduced still picture recorded in the still picture data file 112 corresponding to the AV contents 101 whose icon is active are displayed.

Subsequently, operation of a user to select and playback some AV contents 101 is described. First, the user will use the mouse 29 to select one of the icons corresponding to the cabinets displayed in the AV contents classification display window 203. In response to the operation, icons corresponding to those AV contents 101 which are stored in the selected cabinet are displayed in the AV contents icon display window 204. Then, the user will use the mouse 29 to select one of the icons corresponding to the AV contents 101 displayed in the AV contents icon display window 204 and drag and drop the icon to and on the AV contents recording-playback window displayed by the recording-playback program 81 and shown in FIG. 7.

In response to the operation described, the recording-playback program 81 starts playback of the AV contents 101 corresponding to the dragged and dropped icon. In this instance, attribute information such as a recording mode of the AV contents 101 whose icon has been dragged and dropped is displayed in the playback window 142.

Figure 10:
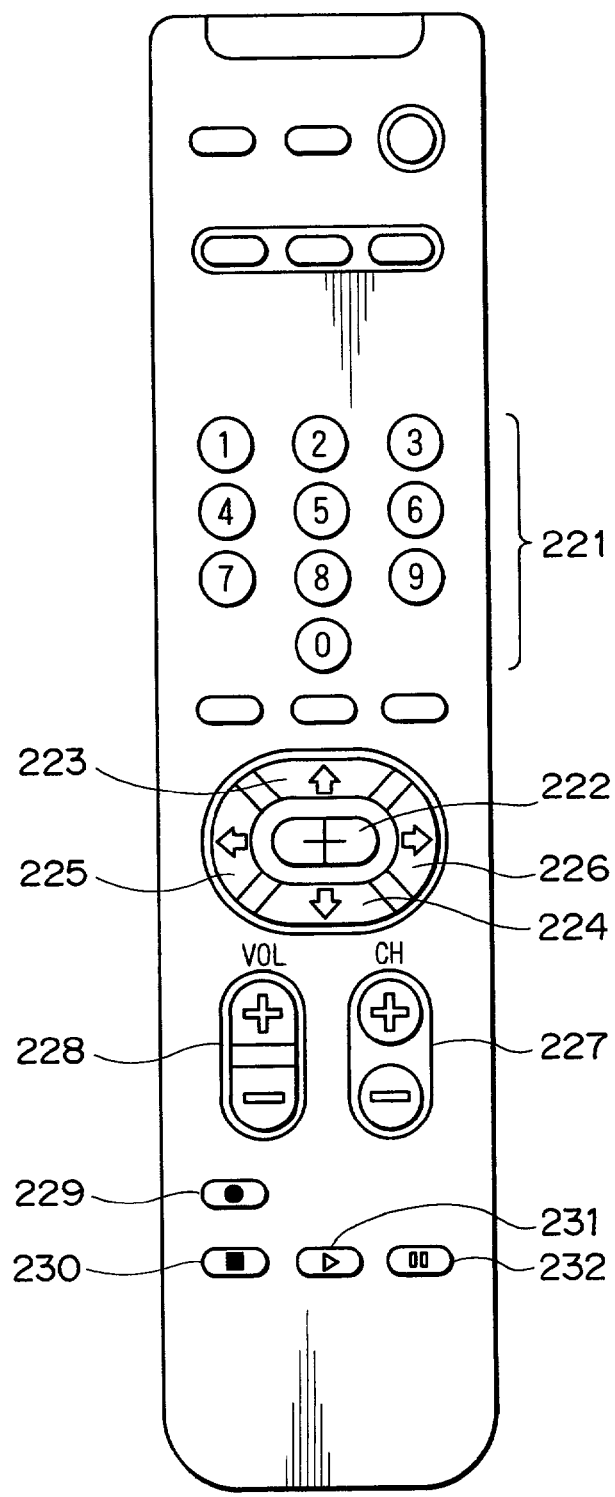
FIG. 10 is a view showing an appearance of a remote controller.

Similar operation to that performed using the mouse 29 as described above can be performed otherwise using the remote controller 10. Before operation where the remote controller 10 is used is described, the remote controller 10 is described with reference to FIG. 10.

When one of various buttons 221 to 232 provided on an upper face of the remote controller 10 is depressed, the remote controller 10 transmits a corresponding operation signal as an infrared signal. The transmitted infrared signal is received by the light reception element 36 connected to the USB interface 35 of the personal computer 1 and converted into an electric signal by the light reception element 36. The electric signal is supplied to the CPU 21 through the USB interface 35, PCI bus 26, bridge 25 and host bus 24.

The numeric buttons 221 of the remote controller 10 are depressed in order to set a channel to be received or recorded. The selection button 222 is depressed in order to display a popup menu 241 (FIG. 11) or select an icon designated by a cursor. The upward button 223 is depressed in order to move the cursor upwardly in the popup menu 241. The downward button 224 is depressed in order to move the cursor downwardly in the popup menu 241. The leftward button 225 is depressed in order to move the cursor leftwardly in the popup menu 241. The rightward button 226 is depressed in order to move the cursor rightwardly in the popup menu 241. The channel button 227 is depressed in order to increment or decrement the channel number to be received or recorded. The volume button 228 is depressed in order to increase or decrease the sound volume. The recording button 229 is depressed in order to start recording. The stop button 230 is depressed in order to stop recording or playback. The playback button 231 is depressed in order to start playback. The pause button 232 is depressed in order to temporarily stop playback.

Figure 11:
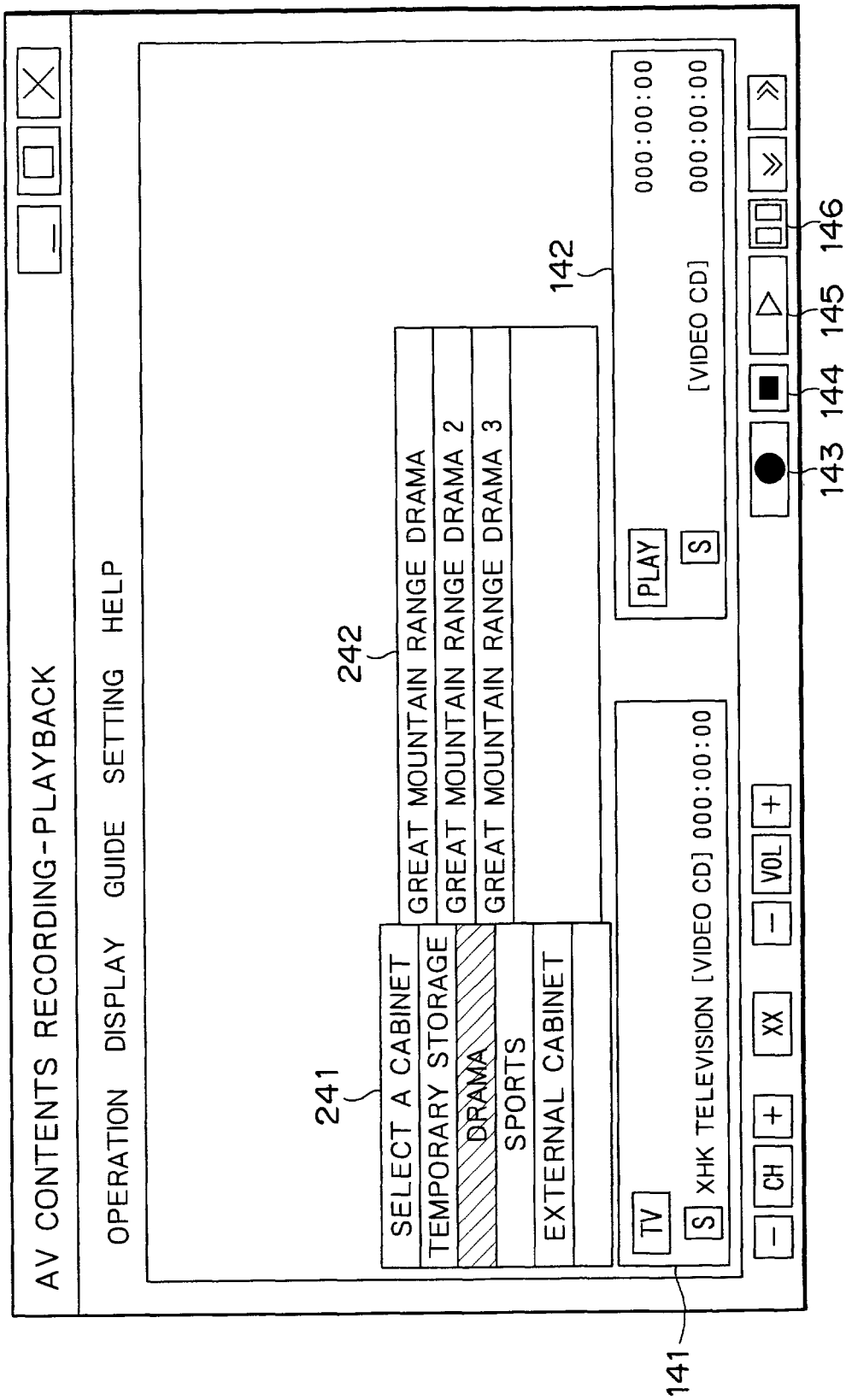
FIGS. 11 and 12 are schematic views illustrating popup windows displayed in the AV contents recording and playback window.

Operation of the remote controller 10 in order to select and play back some AV contents 101 to be played back is described with reference to FIGS. 7, 11 and 12. First, if the user depresses the selection button 222 of the remote controller 10 when the AV contents recording-playback window displayed by the recording-playback program 81 and shown in FIG. 7 is active, then the popup menu 241 for cabinet selection is displayed in the AV contents recording-playback window as seen in FIG. 11 in response to the depression of the selection button 222. In the popup menu 241 for cabinet selection, names of the cabinets in which the AV contents 101 are stored for the individual classes are displayed equivalently to the AV contents classification display window 203 of the AV contents management search window. A popup menu 242 for AV contents selection is displayed alongside the popup menu 241 for cabinet selection. In the popup menu 242 for AV contents selection, names of the AV contents 101 stored in the cabinet selected in the popup menu 241 for cabinet selection are displayed equivalently to the AV contents icon display window 204 of the AV contents management search window.

Figure 12:
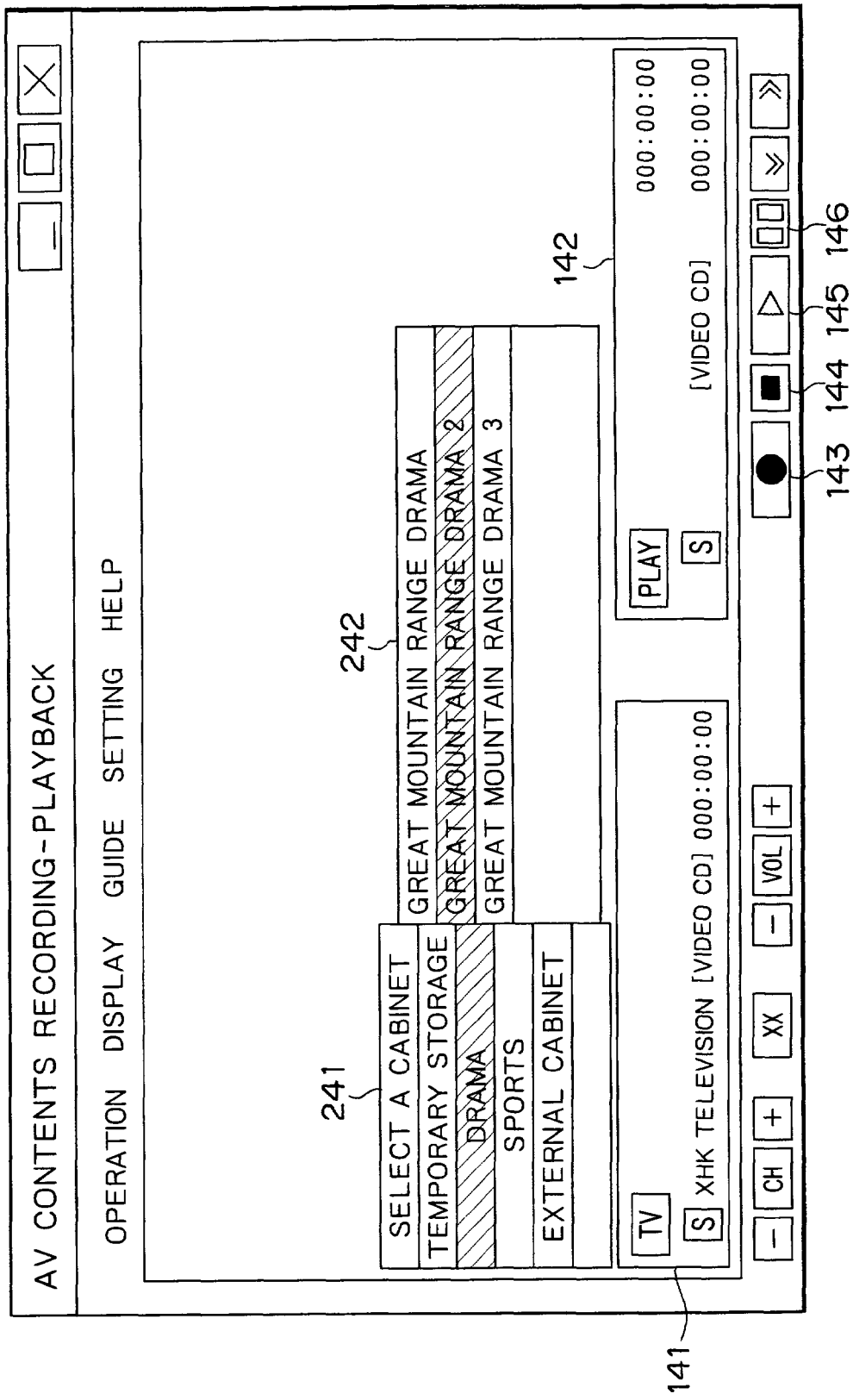

Then, if the user depresses the upward button 223 or the downward button 224 of the remote controller 10 to move the cursor in the popup menu 241 for cabinet selection (in FIG. 11, the cursor is positioned at the drama cabinet) to select a cabinet and then depresses the rightward button 226, then the cursor moves to the popup menu 242 for AV contents selection as seen in FIG. 12. Further, if the user depresses the upward button 223 or the downward button 224 to move the cursor in the popup menu 242 for AV contents selection and designates the name of the AV contents 101 to be played back with the cursor and then depresses the selection button 222, then the recording-playback program 81 starts playback of the AV contents 101 selected by the popup menu 242 for AV contents in accordance with the operation. The recording-playback program 81 further causes information of attributes such as a recording mode of the selected AV contents 101 to be displayed in the playback window 142.

As described above, in order to select and play back AV contents, not only the operation method which uses the mouse 29 but also the operation method which uses the remote controller 10 are provided. Consequently, an operation compatible with regard to an operation procedure where the mouse 29 is used, that is, an operation procedure wherein a cabinet is selected first and then AV contents are selected, can be performed at a remote position from the personal computer 1 using the remote controller 10.

Subsequently, a method of moving or copying AV contents using the AV contents management search window displayed by the AV contents management search program 82 is described with reference to FIGS. 13 and 14.

Figure 13:
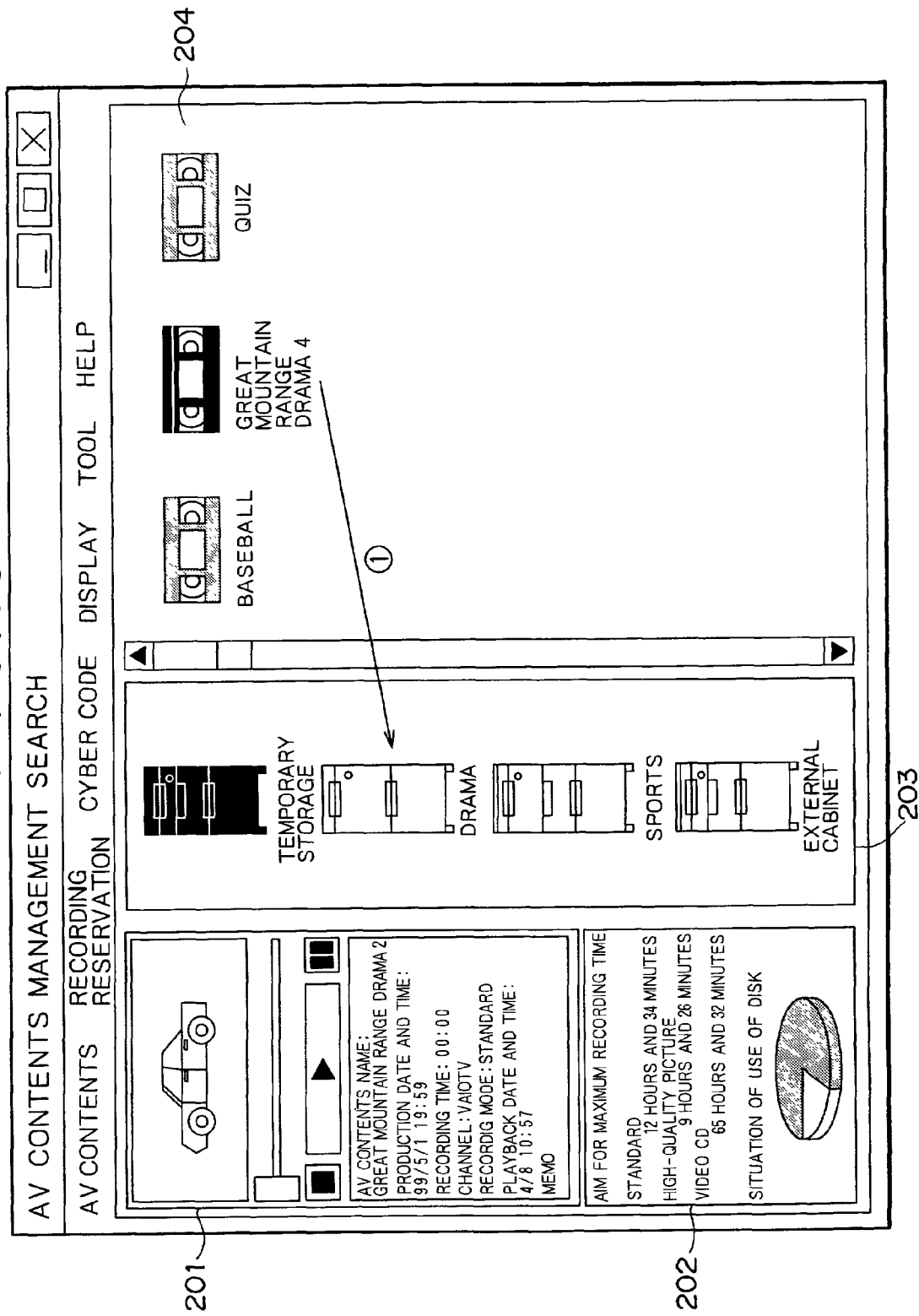
FIGS. 13 and 14 are schematic views illustrating movement and coping of AV contents executed using the AV contents management detection window.

For example, if it is intended to move the AV contents 101 of the "Great mountain range drama 4" classified to the temporary storage cabinet to the drama cabinet, that is, to re-classify the AV contents 101 into the drama, the icon for the "Great mountain range drama 4" displayed in the AV contents icon display window 204 should be dragged to and dropped onto the icon for the drama cabinet displayed in the AV contents classification display window 203 as indicated by ① of FIG. 13. In response to the operation, the AV contents management search program 82 re-classifies the AV contents 101 of the "Great mountain range drama 4" into the drama.

Figure 14:
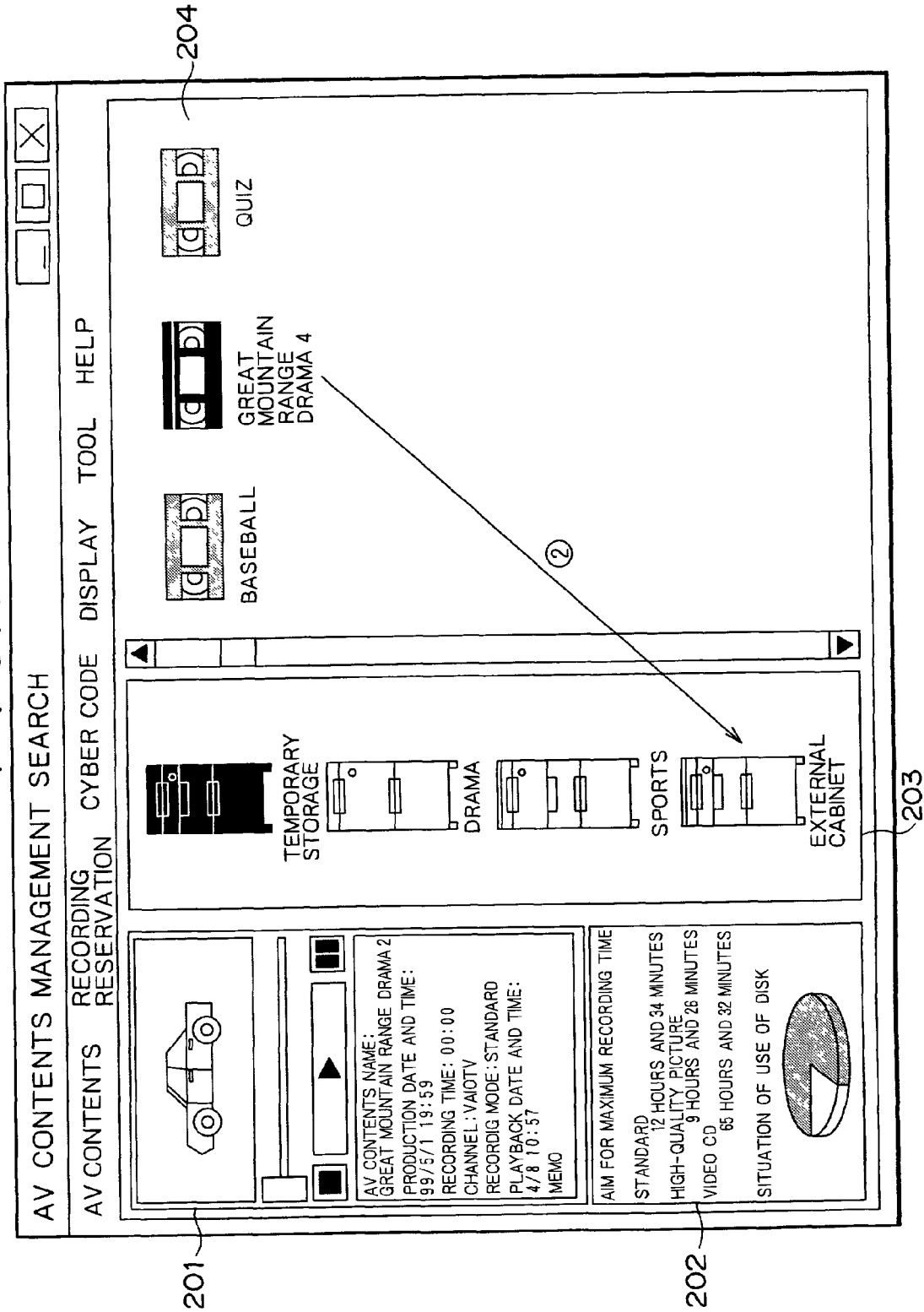

On the other hand, for example, in order to copy the AV contents 101 of the "Great mountain range drama 4" classified to the temporary storage cabinet into an external recording medium such as, for example, the optical disk 42, the icon for the "Great mountain range drama 4" displayed in the AV contents icon display window 204 should be dragged to and dropped onto the icon for the external cabinet corresponding to the external recording medium displayed in the AV contents classification display window 203 as indicated by ② of FIG. 14. It is to be noted, however, that, when some AV contents 101 are to be copied onto an external storage medium such as, for example, the optical disk 42, the copying is performed based on a copy option which can be set taking the compatibility of data and protection of the copyright into consideration.

Figure 15:
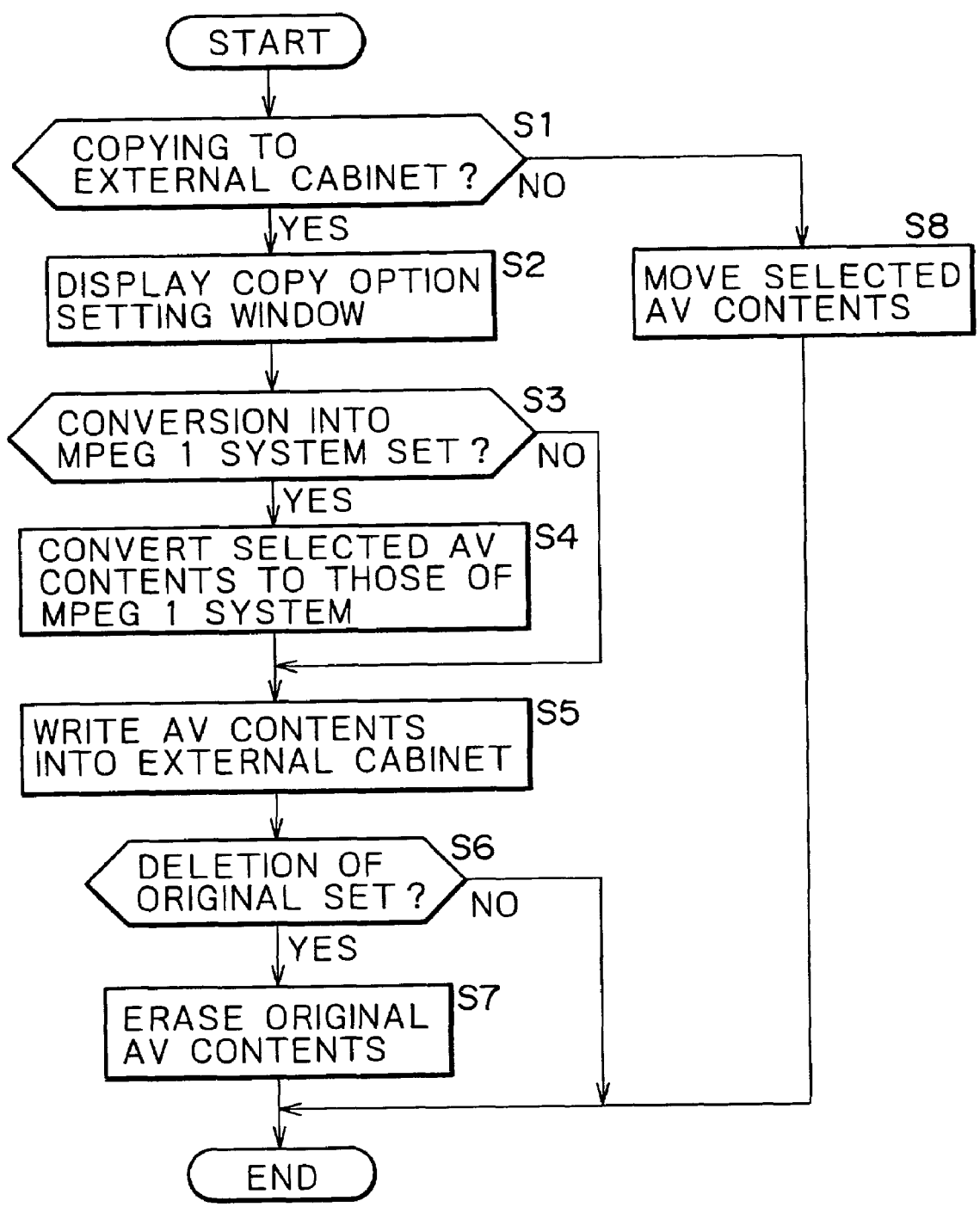
FIG. 15 is a flow chart illustrating movement and coping of AV contents executed using the AV contents management detection window.

More particularly, processing is performed in accordance with a flow chart shown in FIG. 15. Referring to FIG. 15, if one of icons displayed in the AV contents icon display window 204 is dragged to and dropped onto an icon for one of cabinets displayed in the AV contents classification display window 203, then the AV contents management search program 82 discriminates in step S1 whether or not the icon for the AV contents 101 has been dragged to and dropped onto the external cabinet. If it is discriminated that the icon for the AV contents 101 has been dragged to and dropped onto the external cabinet, then the processing advances to step S2.

Figure 16:
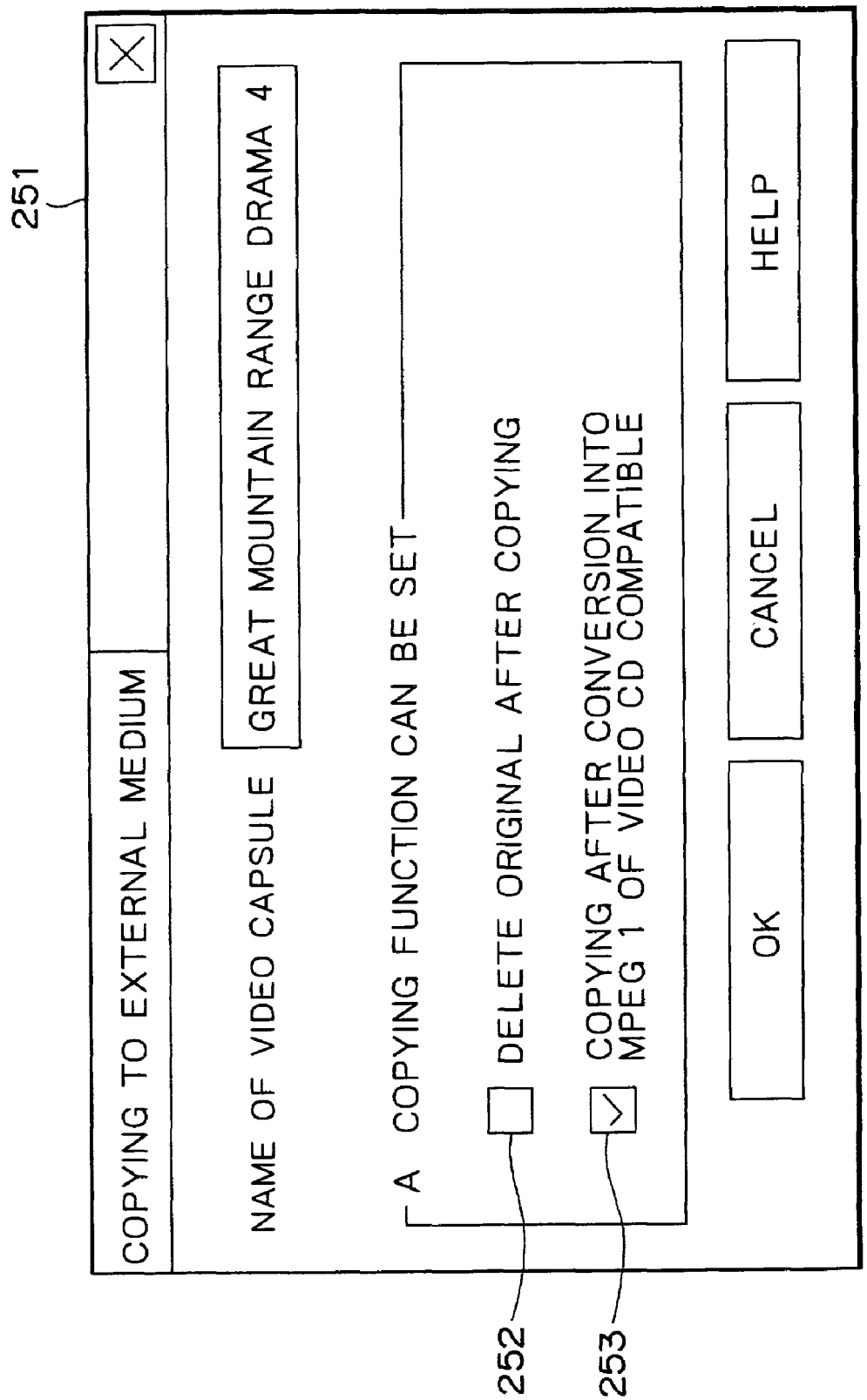
FIG. 16 is a schematic view illustrating a copy option setting window.

In step S2, the AV contents management search program 82 controls the display unit 30 to display a copy option setting window 251 shown in FIG. 16.

A check box 252 of the copy option setting window 251 is selected in order to set so that the original AV contents 101 recorded on the HDD 31 should be deleted after the AV contents 101 are copied onto the external recording medium from the HDD 31. A check box 253 is selected in order to set so that some AV contents 101 recorded as compression data of the MPEG 2 system on the HDD 31 may be copied into an external recording medium after converting the AV contents 101 into compression data of the MPEG 1 system which has compatibility with a video CD. It is to be noted that, in the example shown in FIG. 16, the check box 252 is not selected but the check box 253 is selected.

If the user performs setting of the copy option and selects an OK button in the copy option setting window 251 displayed on the display unit 30, then the processing advances to step S3.

In step S3, the AV contents management search program 82 discriminates based on the check box 253 of the copy option setting window 251 whether or not conversion into the MPEG 1 system is set. If it is discriminated that conversion into the MPEG 1 system is set, then the processing advances to step S4.

In step S4, the AV contents management search program 82 converts the AV contents 101 of the object of copying into data of the MPEG 1 system.

In step S5, the AV contents management search program 82 causes the AV contents 101 of the object of copying or, where the processing advances to step S5 through step S4, the AV contents of the MPEG 1 system as a result of conversion in step S4, to be recorded onto an external recording medium such as, for example, the optical disk 42 corresponding to the external cabinet together with the AV contents attribute record 102 corresponding to the AV contents.

In step S6, the AV contents management search program 82 discriminates based on the check box 252 of the copy option setting window 251 whether or not deletion of the original after copying is set. If it is discriminated that deletion of the original after copying is set, then the processing advances to step S7.

In step S7, the AV contents management search program 82 deletes the original AV contents 101 of the object of copying and the corresponding AV contents attribute record 102 from the HDD 31.

It is to be noted that it is otherwise possible in step S7, for example, to set a flag, which represents whether or not use of the original AV contents 101 is permitted, to an off state while the original AV contents 101 of the object of copying and the corresponding AV contents attribute record 102 remain recorded on the HDD 31 without actually deleting them.

It is to be noted that, if it is discriminated in step S3 that conversion into the MPEG 1 system is not set, then the processing skips step S4. Further, if it is discriminated in step S6 that deletion of the original after copying is not set, then the processing skips step S7.

If it is discriminated in step S1 that the icon for the AV contents 101 has not been dragged to and dropped onto the external cabinet, then the processing advances to step S8. In step S8, the AV contents management search program 82 moves the AV contents 101 of the object of copying to the cabinet to and onto which the icon has been dragged and dropped, that is, re-classifies the AV contents 101 of the object of copying.

As described above, where the AV contents management search window displayed by the AV contents management search program 82 is used, an operation for moving some AV contents 101 between cabinets virtually provided on the HDD 31, that is, for changing the classification of the AV contents 101 and an operation for copying some AV contents 101 recorded on the HDD 31 into an external recording medium such as, for example, the optical disk 42 can be executed by a common drag-and-drop operation. This augments the operability to the user.

Further, when it is tried to record some AV contents 101 onto an external recording medium such as, for example, the optical disk 42, it can be set whether or not conversion into the MPEG 1 system should be involved. This allows compatibility of data to be maintained with other personal computers and so forth which do not support the MPEG 2 system but support only the MPEG 1 system. Furthermore, since it can be set whether or not an original should be deleted after it is copied, protection of the copyright can be anticipated.

Now, a program storage medium which is used to install a program for execution of the series of processes described hereinabove into the personal computer 1 so that the program can be executed by the personal computer 1 is described.

The program storage medium is formed as a package medium such as, as shown in FIG. 2, a magnetic disk 41 (including a floppy disk), an optical disk 42 (including a CD-ROM (Compact Disk-Read Only Memory) and a DVD (Digital Versatile Disk)), or a magneto-optical disk 43 (including an MD (Mini-Disk)), or a semiconductor memory 44 which has the program recorded thereon or therein and is distributed in order to provide the program to a user separately from a computer, or a ROM 22 or a HDD 31 in which the program is stored temporarily or permanently. Storage of the program onto or into a program storage medium is performed when necessary making use of a wired or wireless communication medium such as a local area network, the Internet or a digital satellite broadcast through an interface such as a modem.

It is to be noted that, in the present specification, the steps which describe the program stored in or on a program storage medium may be but need not necessarily be processed in a time series in the order as described, and include processes which are executed parallelly or individually without being processed in a time series.

It is to be noted that, in the present specification, the term "system" represents an entire apparatus which is composed of a plurality of apparatus.

While a preferred embodiment of the present invention has been described using specific terms, such description is for illustrative purposes only, and it is to be understood that changes and variations may be made without departing from the spirit or scope of the following claims.

What is claimed is:

1. An information processing apparatus capable of copying image information recorded on a first recording medium onto a second recording medium, comprising:
    display control means for controlling displaying of a copying operation window which includes an icon corresponding to the first recording medium, at least one image information icon corresponding to the image information recorded on the first recording medium and an icon corresponding to the second recording medium;
    moving means for selecting and moving one of the image information icon in the copying operation window to the second icon;
    determining means for determined if the moving means moves the one of the at least one image information icon to the second icon;
    means for automatically displaying a plurality options to be selected based on a result the determining means prior to copying the image information recorded on the first recording meduim onto the second recording medium;
    first setting means for setting whether a data format of the image information determined as an object of copying by the moving should be converted based on a selection received responsive to the displayed plurality of options;
    readout means for reading out the image information corresponding to the one of the at least one image information icon selected by said moving means from the first recording medium;
    conversion means for converting the data format of the image information read out by said readout means based on the setting of said first setting means; and
    writing means for writing the image information read out by said readout means or the image information converted by said conversion means onto the second recording medium based on the setting of said first setting means.

2. An information processing apparatus according to claim 1, wherein the first recording medium is built in said information processing apparatus, and the second recording medium is an external storage medium which can be removably connected to said information processing apparatus.

3. An information processing apparatus according to claim 1, wherein said conversion means converts the data format of the image information from that of the MPEG 2 system to that of the MPEG 1 system.

4. An information processing apparatus according to claim 1, further comprising:
    second setting means for setting whether the image information of an original determined as the object of copying should be deleted based on a selection received responsive of the displayed plurality of options, and deletion means operable in response to a result of the setting of said second setting means for either deleting or placing into a disabled state the image information of the original of the object of copying recorded on the first recording medium after the processing of said writing means is completed.

5. An information processing method for an information processing apparatus which is capable of copying image information recorded on a first recording medium onto a second recording medium, comprising:
    controlling displaying of a copying operation window which includes a first icon corresponding to the first recording medium, at least one image information icon corresponding to the image information recorded on the first recording medium and a second icon corresponding to the second recording medium;
    selecting and moving one of the at least one image information icon on the copying operation window to the second icon;
    determining if in the selecting and moving step the one of the at least one image information icon moves to the second icon;
    automatically displaying a plurality of options to be selected based on a result of the determining step prior to copying the image information recorded on the first recording medium onto the second recording medium;
    setting whether a data format of the image information determined as an object of copying in the selecting and moving step should be converted based on a selection received responsive to the displayed plurality of options;
    reading out the image information corresponding to the one of the at least one image information icon selected in the selecting and moving step from the first recording medium;
    converting the data format of the image information read out in the reading step based on the setting made in the setting step; and
    writing the image information read out in the reading step or the image information converted in the converting onto the second recording medium based on the setting made in the setting step.

6. A non-transitory program storage medium on which a computer-readable program for controlling copying of image information recorded on a first recording medium onto a second recording medium is recorded, the program including instructions that when executed by processor perform steps comprising:

controlling displaying of a copying operation window which includes a first icon corresponding to the first recording medium, at least one image information icon corresponding to the image information recorded on the first recording medium and a second icon corresponding to the second recording medium;

selecting and moving one of the at least one image information icon on the copying operation window to the second icon;

determining if in the selecting and moving step the one of the at least one image information icon moves to the second icon;

automatically displaying a plurality of options to be selected based on a result of the determining step prior to copying the image information recorded on the first recording medium onto the second recording medium;

setting whether a data format of the image information determined as an object of copying in the selecting and moving step should be converted based on a selection received responsive to the displayed plurality of options;

reading out the image information corresponding to the one of the at least one image information icon selected in the selecting and moving step from the first recording medium;

converting the data format of the image information read out in the reading step based on the setting made in the setting step; and writing the image information read out in the reading step or the image information converted in the converting step onto the second recording medium based on the setting made in the setting step.

7. An information processing apparatus according to claim 1, wherein said conversion means converts the data format of the image information from that of a MPEG 1 system to that of a MPEG 2 system.

8. An information processing method according to claim 5, wherein the converting step includes converting the data format of the image information from that of a MPEG 1 system to that of a MPEG 2 system.

9. An information processing method according to claim 5, wherein the converting step includes converting the data format of the image information from that of a MPEG 2 system to that of a MPEG 1 system.

10. A non-transitory program storage medium according to claim 6, wherein the converting step includes converting the data format of the image information from that of a MPEG 1 system to that of a MPEG 2 system.

11. A non-transitory program storage medium according to claim 6, wherein the converting step includes converting the data format of the image information from that of a MPEG 2 system to that of a MPEG 1 system.

12. The information processing apparatus according to claim 1, wherein the display control means is further configured to highlight the first icon corresponding to the first recording medium after selection of the first icon, and is configured to display the at least one image information icon corresponding to the image information recorded on the first recording medium in the copying operation window.

13. The information processing method according to claim 5, wherein the controlling displaying of the copying operation further includes:

highlighting the first icon corresponding to the first recording medium after selecting of the first icon; and displaying the at least one image information icon corresponding to the image information recorded on the first recording medium in the copying operation window.

14. The non-transitory program storage medium according to claim 6, wherein the controlling displaying of the copying operation further includes:

highlighting the first icon corresponding to the first recording medium after selecting of the first icon; and displaying the at least one image information icon corresponding to the image information recorded on the first recording medium in the copying operation window.

15. The information processing method according to claim 5, further comprising:

setting whether the image information of an original determined as the object of copying should be deleted based on a selection received responsive to the displayed plurality of options; and either deleting or placing into a disabled state the image information of the original of the object of copying recorded on the first recording medium after the processing of said writing means is completed based on the setting whether the image should be deleted.

16. The non-transitory program storage medium according to claim 6, further comprising:

setting whether the image information of an original determined as the object of copying should be deleted based on a selection received responsive to the displayed plurality of options; and either deleting or placing into a disabled state the image information of the original of the object of copying recorded on the first recording medium after the processing of said writing means is completed based on the setting whether the image should be deleted.

* * * * *